(12) United States Patent
Branum

(10) Patent No.: US 6,291,066 B1
(45) Date of Patent: Sep. 18, 2001

(54) POLYETHYLENE GLYCOL MODIFIED POLYESTER FIBERS AND METHOD FOR MAKING THE SAME

(75) Inventor: James Burch Branum, Fort Mill, SC (US)

(73) Assignee: Wellman, Inc., Shrewsbury, NJ (US)

( * ) Notice: Subject to any disclaimer, the term of this patent is extended or adjusted under 35 U.S.C. 154(b) by 0 days.

(21) Appl. No.: 09/484,822

(22) Filed: Jan. 18, 2000

Related U.S. Application Data

(63) Continuation-in-part of application No. 09/444,192, filed on Nov. 19, 1999.

(51) Int. Cl.[7] .............................. D02G 3/00; C08F 20/00
(52) U.S. Cl. .................. 428/364; 528/272; 528/296; 528/300; 528/302; 528/308; 528/308.6; 525/437; 525/444; 428/357
(58) Field of Search ..................................... 508/272, 300, 508/302, 296, 308, 308.6; 525/437, 444; 428/357, 364

(56) References Cited

U.S. PATENT DOCUMENTS

| | | |
|---|---|---|
| Re. 32,741 | 8/1988 | Miyoshi et al. . |
| 2,623,031 | 12/1952 | Snyder . |
| 2,744,087 | 5/1956 | Snyder . |
| 3,576,773 | 4/1971 | Vaginay . |
| 3,775,373 | 11/1973 | Wolfe, Jr. . |
| 3,926,551 | 12/1975 | Okada et al. . |
| 4,035,441 | 7/1977 | Endo et al. . |
| 4,049,621 | 9/1977 | Gilkey et al. . |
| 4,092,299 | 5/1978 | MacLean et al. . |
| 4,113,704 | 9/1978 | MacLean et al. . |
| 4,167,395 | 9/1979 | Engelhardt et al. . |
| 4,207,230 | 6/1980 | Bier et al. . |
| 4,211,678 | 7/1980 | Henry et al. . |
| 4,587,154 | 5/1986 | Hotchkiss et al. . |
| 4,666,454 | 5/1987 | DeMartino et al. . |
| 4,704,329 | 11/1987 | Hancock et al. . |
| 4,705,525 | 11/1987 | Abel et al. . |
| 4,785,060 | 11/1988 | Nagler . |
| 4,827,999 | 5/1989 | Yabuki et al. . |
| 4,975,233 | 12/1990 | Blaeser et al. . |
| 5,039,467 | 8/1991 | Frazier . |
| 5,089,533 | 2/1992 | Park . |
| 5,089,553 | 2/1992 | Umeda et al. . |
| 5,091,504 | 2/1992 | Blaeser et al. . |
| 5,097,004 | 3/1992 | Gallagher et al. . |
| 5,223,317 | 6/1993 | Corbin et al. . |
| 5,552,513 | 9/1996 | Bhatia . |
| 5,709,940 | 1/1998 | George et al. . |
| 5,902,539 | 5/1999 | Schmidt et al. . |

FOREIGN PATENT DOCUMENTS

| | | |
|---|---|---|
| 0 985 752 | 3/2000 | (EP) . |
| 2 021 652 | 12/1979 | (GB) . |
| 2-38421 | 2/1990 | (JP) . |
| 3-174076 | 7/1991 | (JP) . |
| 4-041738 | 2/1992 | (JP) . |
| 4-047132 | 2/1992 | (JP) . |
| 5-295673 | 11/1993 | (JP) . |
| 2808829 | 10/1998 | (JP) . |
| 2932614 | 8/1999 | (JP) . |
| 82333 | 9/1983 | (RO) . |
| 83208 | 1/1984 | (RO) . |
| WO 99/19548 | 4/1999 | (WO) . |
| WO 00/12793 | 3/2000 | (WO) . |

Primary Examiner—Samuel A. Acquah
(74) Attorney, Agent, or Firm—Summa & Allan, P.A.

(57) ABSTRACT

Disclosed is a method of copolymerizing polyethylene glycol (PEG) and branching agent into polyethylene terephthalate (PET) to achieve a polyethylene glycol-modified polyester composition that can be spun into filaments. Fabrics made from fibers formed from the copolyester composition possess wicking, drying, stretching, abrasion-resistance, flame-retardancy, static-dissipation, dyeability, and tactility properties that are superior to those of fabrics formed from conventional polyethylene terephthalate fibers of the same yarn and fabric construction. Also disclosed are polyethylene glycol modified copolyester compositions, fibers, yarns, and fabrics.

102 Claims, 11 Drawing Sheets

Effect of pH on Dye Uptake

Drying Rate

Flammability
NFPA 701 Small Scale

Difference from Conventional Polyester (PET)

POLYETHYLENE GLYCOL MODIFIED POLYESTER FIBERS AND METHOD FOR MAKING THE SAME

CROSS-REFERENCE TO RELATED APPLICATIONS

This application is a continuation-in-part of pending application Ser. No. 09/444,192, filed Nov. 19, 1999, for a Method of Preparing Polyethylene Glycol Modified Polyester Filaments, which is commonly assigned with this application and which is hereby incorporated entirely herein by reference.

FIELD OF THE INVENTION

The present invention relates to the production of polyethylene glycol modified polyester fibers. The present invention also relates to the manufacture of yarns and fabrics from these copolyester fibers.

BACKGROUND OF THE INVENTION

Polyester filament is strong, yet lightweight, and has excellent elastic memory characteristics. Polyester fabric resists wrinkles and creases, retains its shape in garments, resists abrasions, dries quickly, and requires minimal care. Because it is synthetic, however, polyester is often considered to have an unacceptable appearance for garment purposes when initially formed as a filament. Accordingly, polyester filaments require texturing to produce acceptable characteristics of appearance, hand, and comfort in yarns and fabrics. Even then, polyester is often viewed unfavorably in garments.

In pursuit of improved polyesters, various chemical modifications have been attempted to obtain desirable textile features. Unfortunately, some such treatments can produce unexpected or unwanted characteristics in the modified polyester. For example, polyethylene glycol enhances certain polyester properties, such as dye uptake, but diminishes other properties, especially those melt phase characteristics that are critical to filament spinning. Consequently, manufacturers have found that significant fractions of polyethylene glycol in copolyester can complicate—and even preclude—the commercial production of acceptable copolyester filaments. To gain commercial acceptance, modified polyesters must be compatible with commercial equipment with respect to melt-spinning, texturing, yarn spinning, fabric forming (e.g., weaving and knitting), and fabric finishing. This need for processing compatibility through conventional equipment has constrained the development of innovative polyester compositions.

To overcome the limitations of polyester compositions, polyester fibers are often blended with other kinds of fibers, both synthetic and natural. Perhaps most widely used in clothing are blended yarns and fabrics made of polyester and cotton. In general, blended fabrics of polyester and cotton are formed by spinning blended yarn from cotton fibers and polyester staple fibers. The blended yarns can then be woven or knitted into fabrics.

Cotton, like polyester, has certain advantages and disadvantages. Cotton is formed almost entirely of pure cellulose. Cotton fibers are typically about one inch long, but can vary from about one half inch to more than two inches. Mature cotton fibers are characterized by their convolutions. Under a microscope, cotton appears as a twisted ribbon with thickened edges. Cotton is lightweight, absorbs moisture quickly and easily, and has a generally favorable texture (i.e., hand) when woven into fabrics. Cotton, however, lacks strength characteristics and elastic memory. Consequently, garments formed entirely of cotton require frequent laundering and pressing.

Blends of cotton and polyester fibers have found wide-ranging acceptance as they combine the desirable characteristics of each. Even so, there are continuing efforts to develop polyester filament, yarns, and fabrics that more closely resemble those of cotton, silk, rayon, or other natural fibers, One example is polyester microfibers, which are characterized by extremely fine filaments that offer exceptionally good aesthetics and hand, while retaining the benefits of polyester. Polyester microfibers, however, have proved to be difficult to dye because of their high degree of molecular orientation and crystallinity.

A need continues to exist, however, for enhanced polyester compositions that have properties similar to those of cotton and other natural fibers, while retaining the advantages of polyester. One such composition and method for producing the same is disclosed by Nichols and Humelsine in commonly-assigned, pending U.S. patent application Ser. No. 09/141,665, filed Aug. 28, 1998, for Polyester Modified with Polyethylene Glycol and Pentaerythritol. U.S. patent application Ser. No. 09/141,665, which is incorporated entirely herein by reference, discloses a polyester composition that includes polyethylene terephthalate, polyethylene glycol in an amount sufficient to increase the wetting and wicking properties of a fiber made from the composition to a level substantially similar to the properties of cotton, but less than the amount that would reduce the favorable elastic memory properties of the polyester composition, and chain branching agent in an amount that raises the melt viscosity of the polyester composition to a level that permits filament manufacture under substantially normal spinning conditions. Including significant concentrations of branching agents to increase melt viscosity, however, is sometimes undesirable because branching agents promote cross-linking. This reduces filament strength, which can lead to processing failures.

Moreover, a method for achieving enhanced polyester fibers is described by Branum in commonly-assigned, pending U.S. patent application Ser. No. 09/444,192, filed Nov. 19, 1999, for a Method of Preparing Polyethylene Glycol Modified Polyester Filaments. U.S. patent application Ser. No. 09/444,192, which, as noted, is incorporated entirely herein by reference, describes copolymerizing polyethylene glycol, which typically makes up between about 4 percent and 20 percent by weight of the resulting copolyester, into polyethylene terephthalate in the melt-phase to a relatively low intrinsic viscosity (i.e., a viscosity that will not support filament spinning). The resulting PEG-modified polyester is then further polymerized in the solid phase until the copolyester is capable of achieving a melt viscosity sufficient to spin filaments. By introducing a solid state polymerization (SSP) step, this method reduces the need to add branching agents, such as pentaerythritol, to increase the melt-phase polymerization rate and thereby achieve an intrinsic viscosity that facilitates the spinning of filaments. U.S. patent application Ser. No. 09/444,192 explains that branching agents promote cross-linking, which can lead to relatively weaker textiles.

OBJECT AND SUMMARY OF THE INVENTION

Therefore, it is an object of this invention to provide polyethylene glycol modified polyester fibers that possess favorable characteristics similar to natural fibers, yet retain the advantages of polyester, and that can be formed into exceptionally comfortable fabrics. It is a further object of the present invention to provide a method of copolymerizing polyethylene glycol (PEG) into polyethylene terephthalate (PET) in the melt phase to achieve a PEG-modified polyester composition that is readily spun into filaments.

As is understood by those of ordinary skill in the art, modifying conventional polyesters with polyethylene glycol can improve certain polyester characteristics, yet can adversely affect others. For example, adding polyethylene glycol to polyethylene terephthalate improves wetting and wicking, but slows melt-phase polymerization kinetics. It also depresses melt viscosity and renders the processing of such PEG-modified polyesters somewhat impractical in commercial polyester spinning operations.

Accordingly, in one aspect, the invention is a method of copolymerizing polyethylene glycol into polyethylene terephthalate in a way that retains the favorable properties of polyethylene glycol while attaining a high intrinsic viscosity. This facilitates the commercial spinning of the PEG-modified polyester using conventional spinning equipment. As will be understood by those having ordinary skill in the art, copolymerizing polyethylene glycol and branching agent into polyethylene terephthalate is conventionally achieved by reacting ethylene glycol and either terephthalic acid or dimethyl terephthalate in the presence of polyethylene glycol and branching agent.

In one aspect, the invention is a method of copolymerizing polyethylene glycol and a chain branching agent into polyethylene terephthalate in the melt phase to form a copolyester composition having an intrinsic viscosity of at least about 0.67 dl/g. In this regard, the polyethylene terephthalate is present in the copolyester composition in an amount sufficient for a fiber made from the copolyester composition to possess dimensional stability properties substantially similar to those of conventional, unmodified polyethylene terephthalate fibers. The polyethylene glycol has an average molecular weight of less than about 5000 g/mol and is present in an amount sufficient for a fiber made from the copolyester composition to possess wicking, drying, and static-dissipation properties that are superior to those of conventional, unmodified polyethylene terephthalate fibers. The chain branching agent is present in the copolyester composition in an amount between about 0.0003 and 0.0014 mole-equivalent branches per mole of standardized polymer, the standardized polymer being unmodified polyethylene terephthalate. Finally, the copolyester composition is spun into a filament.

In another aspect, the invention is a method of spinning the modified polyester composition to form partially oriented yarns (POY). The resulting copolyester POY is particularly suitable for yarns and fabrics, either alone or in a blend with one or more other kinds of fibers. In yet another aspect, the invention is a method of spinning the modified polyester composition to form staple filaments, which can be drawn (and perhaps crimped), and cut into staple fiber. Staple fiber, in turn, can be formed into polyester yarns by employing conventional spinning techniques (e.g., ring, open-end, air-jet, or vortex spinning). In addition, continuous filament and spun yarns can then be formed into fabrics, preferably by knitting or weaving, either alone or in a blend with one or more other kinds of fibers. In yet another aspect, the invention is a method of dyeing the copolyester fibers at or below a temperature of 240° F., and preferably below the temperature defined by the boiling point of water at atmospheric pressure.

A distinct advantage of the present method is that it produces a copolyester fiber that, while possessing wicking, drying, flame-retardancy, abrasion-resistance, soft hand, dye uptake, and static-dissipation properties that are superior to those of conventional polyethylene terephthalate fibers, can be processed using conventional melt spinning equipment (e.g., spun into partially oriented yarns or formed into staple fibers).

The foregoing, as well as other objectives and advantages of the invention and the manner in which the same are accomplished, is further specified within the following detailed description and its accompanying drawings.

DETAILED DESCRIPTION

Figure 1:
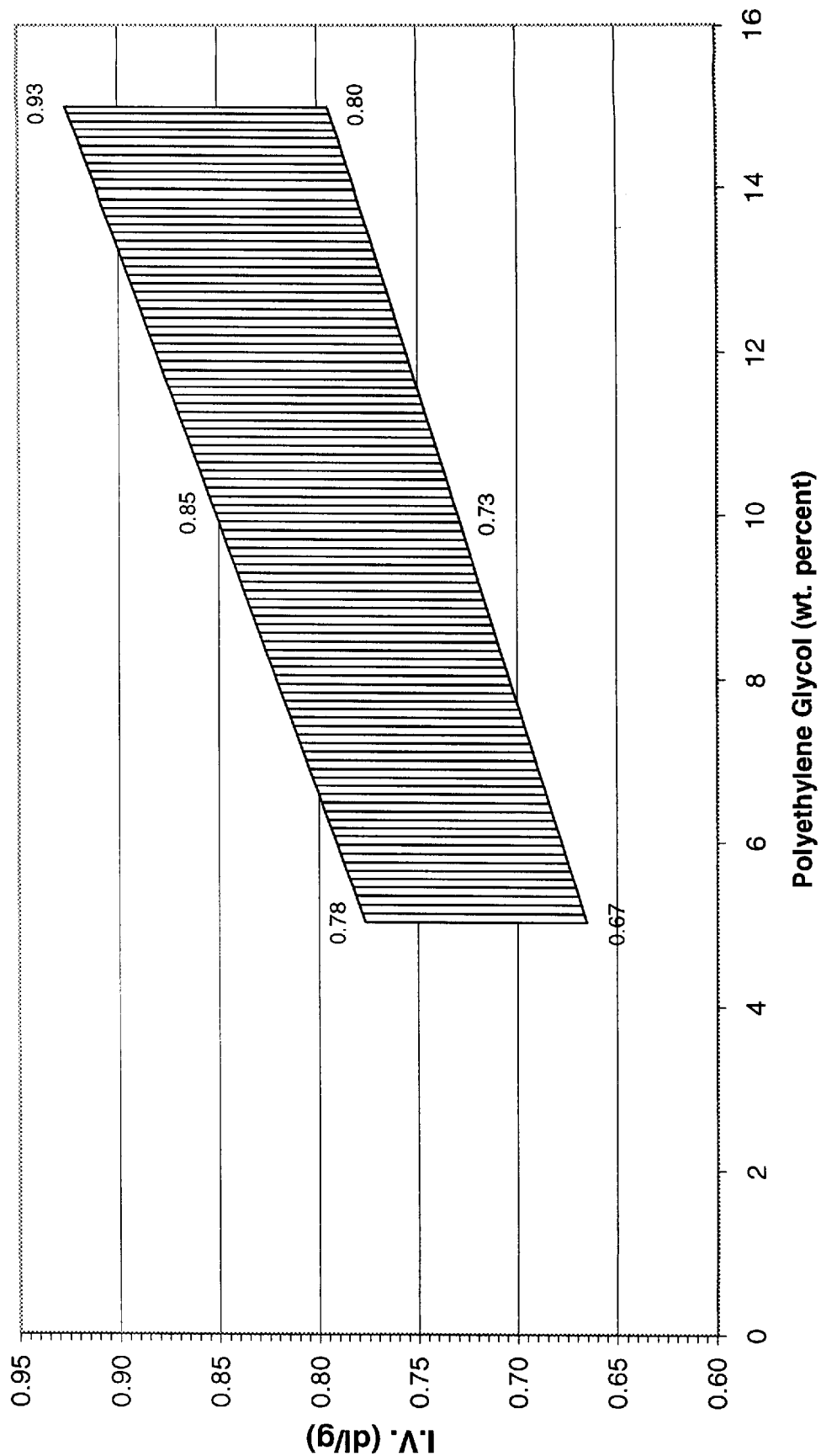
FIG. 1 describes the melt-polymerized intrinsic viscosity of PEG-modified copolyester versus the weight fraction of polyethylene glycol when branching agent is employed in an amount of less than about 0.0014 mole-equivalent branches per mole of standardized polymer.

Parent U.S. patent application Ser. No. 09/444,192 discloses a method of preparing PEG-modified copolyester fibers by copolymerizing polyethylene glycol into polyethylene terephthalate in the melt phase to form a copolyester composition, then polymerizing the copolyester composition in the solid phase until the copolyester is capable of achieving a melt viscosity that facilitates the spinning of filaments, and thereafter spinning filaments from the copolyester.

The present invention is an alternative method of preparing PEG-modified copolyester fibers that can be formed into exceptionally comfortable fabrics. In a broad aspect, the method includes copolymerizing polyethylene glycol and a chain branching agent into polyethylene terephthalate in the melt phase to form a copolyester composition having an intrinsic viscosity of at least about 0.67 dl/g. Preferably, this copolyester composition achieves a zero-shear melt viscosity of between about 2000 and 3500 poise when heated to 260° C.

The polyethylene terephthalate is present in the copolyester composition in an amount sufficient for a fiber made from the copolyester composition to possess dimensional stability properties substantially similar to those of conventional, unmodified polyethylene terephthalate fibers. The polyethylene glycol has an average molecular weight of less than about 5000 g/mol and is present in an amount sufficient for a fiber made from the copolyester composition to possess wicking, drying, and static-dissipation properties that are superior to those of conventional, unmodified polyethylene terephthalate fibers. The chain branching agent is present in the copolyester composition in an amount less than about 0.0014 mole-equivalent branches per mole of standardized polymer, and more preferably in an amount between about 0.0003 and 0.0014 mole-equivalent branches per mole of standardized polymer, the standardized polymer being unmodified polyethylene terephthalate. (As discussed herein, to describe the molar fraction of branching agent consistently, mole-equivalent branches are referenced to unmodified polyethylene terephthalate.) Finally, the copolyester composition is spun into a filament.

The present invention incorporates into polyester the favorable properties of polyethylene glycol, such as its outstanding wetting and wicking properties, by employing a higher intrinsic viscosity to compensate for the tendency of higher fractions of polyethylene glycol to lower the melt viscosity of the copolyester. Consequently, the present method need not employ significant amounts of branching agent. As will be understood by those of skill in the art, a low melt viscosity hinders the processing of copolyester through conventional spinning equipment.

The present invention differs from the method disclosed by the aforementioned U.S. patent application Ser. No. 09/444,192 in that the melt polymerization is continued until an intrinsic viscosity of at least 0.67 dl/g, whereupon the copolyester is spun into a filament. In contrast, the parent application employs a solid state polymerization step to achieve high intrinsic viscosities.

The invention is also a polyethylene glycol modified copolyester fiber that includes polyethylene terephthalate in an amount sufficient for the copolyester fiber to possess dimensional stability properties substantially similar to those of conventional, unmodified polyethylene terephthalate fibers, polyethylene glycol having an average molecular weight of less than about 5000 g/mol in an amount sufficient for the copolyester fiber to possess wicking, drying, and static-dissipation properties that are superior to those of conventional, unmodified polyethylene terephthalate fibers, and chain branching agent in an amount less than about 0.0014 mole-equivalent branches per mole of standardized polymer, the standardized polymer being unmodified polyethylene terephthalate. The copolyester fiber has an intrinsic viscosity of at least about 0.67 dl/g.

As used herein, the term "copolyester fiber" broadly refers to uncut filament (e.g., POY, flat-drawn yarn, or textured yarn) and cut fiber (e.g., staple fiber). Although the term "copolyester filament" may include fibers, such as staple, that are subsequently cut from spun filament, it is generally used to refer to an extruded fiber of indefinite length. The meaning of the terms "copolyester fiber" and "copolyester filament" will be easily understood by those of ordinary skill in the art based on the contextual use of these terms.

The terms "melt viscosity" and "intrinsic viscosity" are used herein in their conventional sense. As used herein, the term "melt viscosity" refers to "zero-shear melt viscosity" unless indicated otherwise.

Melt viscosity represents the resistance of molten polymer to shear deformation or flow as measured at specified conditions. Melt viscosity is primarily a factor of intrinsic viscosity, shear, and temperature. The zero-shear melt viscosity at a particular temperature can be calculated by employing ASTM Test Method D-3835-93A to determine melt viscosities at several shear rates between about 35 sec$^{-1}$ and 4000 sec.$^{-1}$, and thereafter extrapolating these melt viscosities to zero. In calculating zero-shear viscosity, it is recommended that several low shear rates (e.g., less than 100 sec$^{-1}$) be included to ensure that the extrapolation to zero is accurate.

Intrinsic viscosity is the ratio of the specific viscosity of a polymer solution of known concentration to the concentration of solute, extrapolated to zero concentration. Intrinsic viscosity is directly proportional to average polymer molecular weight. See, e.g., *Dictionary of Fiber and Textile Technology*, Hoechst Celanese Corporation (1990); Tortora & Merkel, *Fairchild's Dictionary of Textiles* (7$^{th}$ Edition 1996). As used herein, average molecular weight refers to number-average molecular weight, rather than weight-average molecular weight.

Both melt viscosity and intrinsic viscosity, which are widely recognized as standard measurements of polymer characteristics, can be measured and determined without undue experimentation by those of ordinary skill in this art. For the intrinsic viscosity values described herein, the intrinsic viscosity is determined by dissolving the copolyester in orthochlorophenol (OCP), measuring the relative viscosity of the solution using a Schott Autoviscometer (AVS Schott and AVS 500 Viscosystem), and then calculating the intrinsic viscosity based on the relative viscosity. See, e.g., *Dictionary of Fiber and Textile Technology* ("intrinsic viscosity").

In particular, a 0.6-gram sample (+/−0.005 g) of dried polymer sample is dissolved in about 50 ml (61.0–63.5 grams) of orthochlorophenol at a temperature of about 1050C. Fiber and yarn samples are typically cut into small pieces, whereas chip samples are ground. After cooling to room temperature, the solution is placed in the viscometer and the relative viscosity is measured. As noted, intrinsic viscosity is calculated from relative viscosity.

As will be understood by those having ordinary skill in the art, copolymerizing polyethylene glycol and branching agent into polyethylene terephthalate is conventionally achieved by reacting ethylene glycol and either terephthalic acid or dimethyl terephthalate in the presence of polyethylene glycol and branching agent. Consequently, it is preferred that the copolymerization of polyethylene glycol and chain branching agent into polyethylene terephthalate yield a copolyester composition that is comprised of polymer chains formed from structural units consisting essentially of diol monomers, aromatic non-substituted diacid monomers, and branching agent monomers. As herein described, such copolyester compositions are preferably formed into copolyester fibers.

The term "diol monomer" as herein used refers to diols, such as ethylene glycol, propylene glycol, and butane diol, as well as ethers that possess terminal alcohols, such as diethylene glycol (DEG). In this regard, polyethylene glycol (PEG) is formed from such ethylene glycol monomers and is therefore embraced by the term "diol monomer." The term "aromatic non-substituted diacid monomers" as herein used refers to aromatic carboxylic diacids and diesters, especially terephthalic acid (TA) and its dialkyl ester, dimethyl terephthalate (DMT), whose functional groups are limited to those that facilitate polymer chain growth and that can be used to prepare modified polyethylene terephthalate. Accordingly, "aromatic non-substituted diacid monomers" include single-ringed compounds, such as isophthalic acid and its dialkyl ester (i.e., dimethyl isophthalate), and polycyclic compounds, such as 2,6 naphthalene dicarboxylic acid or its dialkyl ester (i.e., dimethyl 2,6 naphthalene dicarboxylate). Finally, the term "branching agent" refers to a multifunctional monomer that promotes the formation of side branches of linked monomer molecules along the main polymer chain. See Odian, Principles of Polymerization, pp. 18–20 (Second Edition 1981). Moreover, it will be understood by those of ordinary skill in the art that the terminal ends of the copolyester chains may be structural units characterized by a lone, chain-propagating reactive site. Such chain terminating groups are within the scope of the phrase "consisting essentially of diol monomers, aromatic non-substituted diacid monomers, and branching agent monomers."

In accordance with the invention, copolyester characteristics can be tailored for specific applications by altering the polyethylene glycol content. This permits choice in designing fabrics made with copolyester or copolyester blends according to the present invention. In this sense, the invention establishes a technology family. For example, the weight fraction and the molecular weight of the polyethylene glycol can be adjusted to produce specific effects, such as wicking, drying, dye rates, stretch, and softness. Similarly, such modifications can improve the dye strike rate and reduce the dye usage. In particular, higher polyethylene glycol fractions, (e.g., greater than about 4 weight percent), result in softer fabrics that wick faster, dry quicker, and dye darker as compared to conventional polyesters. The present copolyester shows as much as 30 percent more dye uptake of non-exhaustive polyester dye formulations as compared to conventional polyesters.

In practicing the present invention, It is preferred that the polyethylene glycol formulations include sufficient concentrations of antioxidants to prevent formaldehyde generation during spinning operations. For example, the polyethylene glycol used in the development of the present invention includes about 1.36 weight percent of Irganox 245, an antioxidant that is available from Ciba-Geigy. The inclusion of this or similar antioxidants will not adversely affect the methods herein described.

In preferred embodiments, the polyethylene glycol is present in the copolyester composition in an amount between about 4 weight percent and 20 weight percent. When amounts of polyethylene glycol greater than about 20 weight percent are present, the resulting copolyester does not polymerize efficiently. Moreover, at such elevated polyethylene glycol fractions, the icopolyester composition is difficult to store and transport for it tends to crystallize, which causes undesirable sticking and clumping. Consequently, polyethylene glycol amounts between about 8 weight percent and 14 weight percent are more preferred, and amounts between about 10 weight percent and 12 weight percent are most preferred. Furthermore, while polyethylene glycol with an average molecular weight of less than about 5000 g/mol may be effectively employed, the preferred average molecular weight for polyethylene glycol is between about 300 and 1000 g/mol, most preferably 400 g/mol.

For consistency in discussing composition and fiber properties, the data herein disclosed refer to copolyester of the present invention that is modified between about 10 and 12 weight percent polyethylene glycol having a molecular weight of about 400 g/mol, unless indicated otherwise.

As known to those familiar with the manufacture of polyester, the equipment used to spin polyester into filaments is designed, built, and adjusted to process polymers whose zero-shear melt viscosity falls within a certain range, typically between about 1500 and 4000 poise. Thus, such equipment runs most satisfactorily when the melt viscosity of the copolyester, which is directly proportional to the intrinsic viscosity as discussed herein, is within this viscosity range. If polyethylene glycol is included in relatively significant amounts (i.e., more than about 4 weight percent), a number of spinning failures are likely to occur when conventional polymerization methods are followed (e.g., the intrinsic viscosity is not increased). In other words, high polyethylene glycol fractions can suppress melt viscosity, which in turn can hinder spinning productivity.

Thus, the melt polymerization of polyethylene glycol and branching agent into polyethylene terephthalate continues until the PEG-modified polyester has a melt viscosity sufficient for practical processing, and sufficient spinning tensions for a stable and high-throughput commercial process. This is so despite the presence of only insignificant amounts of branching agent (i.e., between about 0.03 and 0.14 percent mole-equivalent branches per mole of standardized polymer).

According to the present method, copolyester filaments are preferably spun at a temperature between about 260° C. and 300° C. This temperature range comports with that employed in conventional spinning equipment using Dowtherm A vapor heat transfer media, which is available from Dow Chemical Co.

Accordingly, in one preferred embodiment, the method includes copolymerizing between about 10 and 12 weight percent polyethylene glycol and a chain branching agent in an amount between about 0.0003 and 0.0014 mole-equivalent branches per mole of standardized polymer into polyethylene terephthalate in the melt phase to form a copolyester composition that achieves a zero-shear melt viscosity of between about 2000 and 3500 poise when heated to 260° C. In another embodiment, the copolyester composition is spun into filaments having a mean tenacity of less than 3 grams per denier. A tenacity of less than 3 grams per denier accentuates the superior tactility (i.e., soft hand) of the copolyester filament and staple fiber, and reduces the tendency of staple fiber to pill.

As will be understood by those having ordinary skill in this art, the copolyester need not be spun immediately after undergoing melt polymerization. In one embodiment, the copolyester is formed into chips after the step of copolymerizing polyethylene glycol and a chain branching agent into polyethylene terephthalate in the melt phase and before the step of spinning the copolyester composition into a filament.

As discussed previously, in its broadest aspects, the method includes copolymerizing polyethylene glycol and a chain branching agent into polyethylene terephthalate in the melt phase to form a copolyester composition having an intrinsic viscosity of at least about 0.67 dl/g. Thereafter, the copolyester composition is spun into a filament. FIG. 1 defines the preferred intrinsic viscosity of the copolyester after melt polymerization as a function of the weight fraction of polyethylene glycol when chain branching agent is present in the copolyester composition in an amount between about 0.0003 and 0.0014 mole-equivalent branches per mole of standardized polymer (e.g., between about 110 ppm and 500 ppm of pentaerythritol).

In particular, when the weight fraction of polyethylene glycol in the copolyester composition is about 5 percent, the copolyester composition is preferably polymerized in the melt phase to an intrinsic viscosity of between about 0.67 and 0.78 dl/g. Similarly, when the weight fraction of polyethylene glycol in the copolyester composition is between about 10 and 12 percent, the copolyester composition is preferably polymerized in the melt phase to an intrinsic viscosity of between about 0.73 and 0.88 dl/g. Finally, when the weight fraction of polyethylene glycol in the copolyester composition is about 15 percent, the copolyester composition is preferably polymerized in the melt phase to an intrinsic viscosity of between about 0.80 and 0.93 dl/g.

It will be understood to those of skill in the art that the polyethylene glycol reduces melt temperature ($T_m$) and glass transition temperature ($T_g$). For example, at a 10 weight percent substitution of polyethylene glycol having a molecular weight of about 400 g/mol, $T_m$ is approximately 238° C. and $T_g$ is approximately 48° C. Consequently, the temperature at which dyes will penetrate the modified polyester structure is lowered.

Accordingly, the present method further comprises dyeing the copolyester filaments at a temperature of less than about 240° F. Above 240° F., fastness may somewhat decrease using certain dyes at high concentrations. In one preferred embodiment, the method includes dyeing the copolyester filaments at a temperature of less than about 230° F. In yet another preferred embodiment, the method includes dyeing the copolyester filaments at a temperature of less than about 220° F. In fact, the copolyester filaments can be dyed at or below the temperature defined by the boiling point of water at atmospheric pressure (i.e., 212° F. or 100° C.).

More specifically, the copolyester fibers can achieve excellent color depth even when dyed at 200° F. In this regard, when high-energy disperse dyes (e.g., Color Index Disperse Blue 79) are employed, the copolyester fibers are most preferably dyed between about 200° F. and 212° F. Similarly, when low-energy disperse dyes (e.g., Color Index Disperse Blue 56) are employed, the copolyester fibers are preferably dyed between about 180° F. and 200° F., and most preferably dyed between about 180° F. and 190° F. As will be understood by those of ordinary skill in the dyeing arts, with respect to the present copolyester fibers, high-energy dyes typically have better wash fastness and poorer light fastness as compared to low-energy dyes.

A particular advantage of the present invention is that the disclosed copolyester fibers may be dyed at atmospheric pressure without a carrier (i.e., a dye bath additive that promotes the dyeing of hydrophobic fibers), although leveling and dispersing agents are recommended. Moreover, unlike conventional polyester fibers, which typically require an acidic dye bath adjustment to a pH of about 4–5, the present copolyester fibers do not require any pH modification. In this regard, the copolyester can be effectively disperse dyed in an alkaline dye bath having a pH as high as 10, limited only by the stability of the disperse dyes at such alkaline conditions and 210° F. rather than the properties of the present copolyester. Furthermore, the copolyester fibers of the present invention have comparable hand to polyester microfibers (i.e., fibers <1 dpf), yet demonstrate superior dyeing properties.

The copolyester fiber of the present invention also possesses a high exhaustion rate, which translates to reduced dye costs and fewer environmental issues. In fact, dye uptake is maximized near the normal boiling point of water (i.e., 212° F.). in preferred embodiments, the dyeing of the copolyester fibers employs a relatively high ramp rate of about 5° F. per minute below 100° F., as the fibers absorb little dye at such temperatures. Above 100° F., however, the fibers do absorb dye and so the ramp rate should be reduced to about 2° F. per minute to achieve level dyeing. Optionally, a holding period between about 5 and 10 minutes may be employed between about 120 and 190° F. to promote level dyeing.

Figure 2:
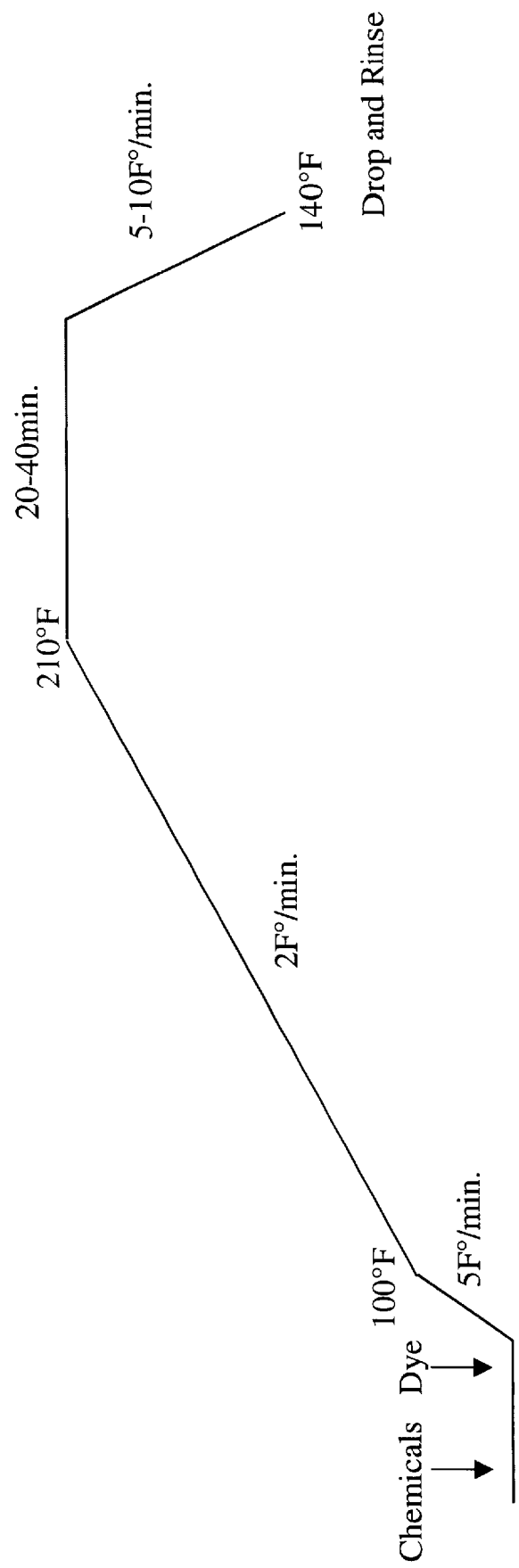
FIG. 2 describes effective model for batch dyeing the copolyester fibers produced according to the present invention.

An effective ramp technique for batch dyeing, especially for jet or beck dyeing, is illustrated as FIG. 2. Minor adjustments to FIG. 2 may be appropriate for package and beam dyeings. Because the copolyester fibers of the present invention begin to dye at 100° F., fabrics formed from the copolyester fibers should be home laundered in cold to warm water (i.e., less than 105° F.) to ensure that dyes from other fabrics do not stain the copolyester fabrics.

As used herein, the concept of dyeing copolyester filaments broadly includes dyeing not only uncut filaments (e.g., partially oriented yarns or textured yarns), but also cut filaments (e.g., staple fibers). Moreover, this concept further includes dyeing copolyester fibers that are formed into yarns or fabrics, either alone or in blends with one or more other kinds of fiber (e.g., cotton or spandex fibers).

To evaluate the dyeing characteristic, the disperse dyeability of the PEG-modified copolyester was studied using Color Index Disperse Blue 56, 73, and 79. See Example 1 (below). These kinds of generic dyes, which are readily available, are representative low, medium and high energy disperse dyes, respectively.

EXAMPLE 1

The copolyester fabric used in the testing was a 2×2 twill fabric using a 150 denier 100 filament count textured continuous filament yarn formed from copolyester fibers including between about 10 and 12 weight percent polyethylene glycol having a molecular weight of about 400 g/mol. A comparison fabric made of conventional polyester was also employed. This fabric was plain woven, 38×58 greige count with crimped polyethylene terephthalate filament yarn, and a fabric weight of 4.3 oz/sq.yd.

The copolyester fabric was washed according to MTCC Test Method 124–1996, on normal cycle, at 105° F. for 8 minutes, to remove spin finishes and size materials. A pot dyeing method was used, wherein the liquor ratio was 10:1 and the fabric size was about 5"×12". Dyeing temperature was raised from ambient to 212° F. at a rate of 3° F./minute and held at 212° F. for 30 minutes with a dye concentration of 3 percent on weight of fabric (owf), unless otherwise stated. The conventional PET fabric was dyed at 265° F. for 30 minutes. Dyeing pH was adjusted by acetic acid and $Na_2CO_3$/$NaHCO_3$ buffer for the acidic and alkaline dyeing conditions, respectively. After dyeing, the fabrics were washed in a wash machine according to AATCC Test Method 124–1996, on normal cycle, at 105° F. for 8 minutes, then tumble dried. After dyeing, the dye uptake was evaluated and compared by K/S values at the wavelength with maximum absorbency. This describes shade depth and is directly proportional to dye concentration on the fiber, provided the shade depth is not too high. Wash fastness was examined according to MTCC Test Method 61-2A(1996). Crock fastness was examined according to MTCC Test Method 8-1996.

Figure 3:
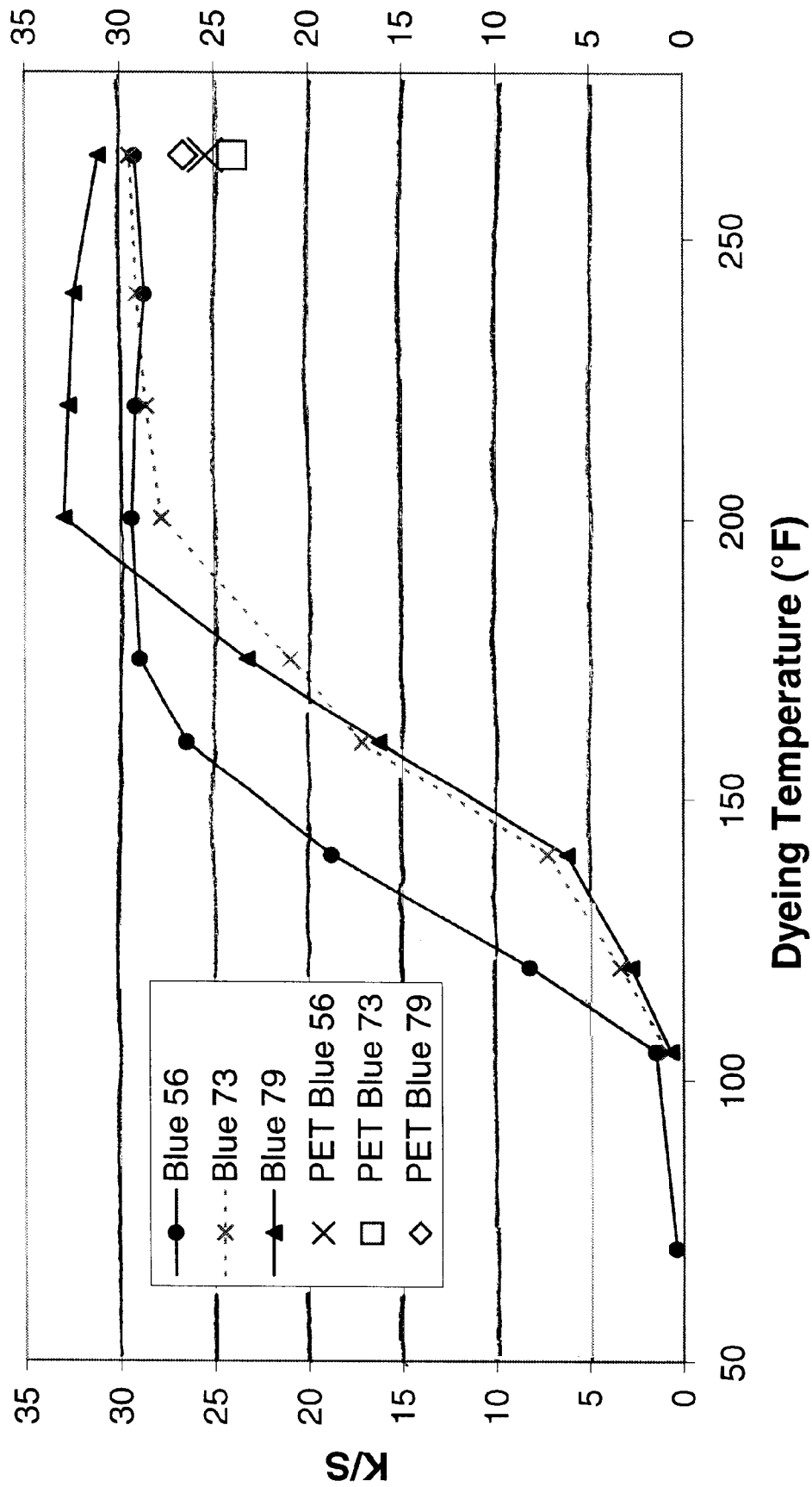
FIG. 3 describes the effect of temperature on uptake of low-energy, medium-energy, and high-energy dyes at a pH of about 5.

To evaluate temperature effects upon dyeing, fabrics were held at various temperatures for 60 minutes at a pH of 5. Thereafter, K/S values were measured. FIG. 3 describes the results. For the low-energy Disperse Blue 56, the optimal K/S value was achieved at 180° F. For the high-energy Disperse Blue 79, 200° F. provides excellent dye uptake. With respect to medium-energy Disperse Blue 73, dye uptake increased from 200° F. to 265° F., although the subsequent gain in dye uptake was minimal. For comparison, a conventional polyethylene terephthalate fabric was dyed at 265° F.

FIG. 3 shows that the copolyester fibers begin to dye at about 110° F. At 120° F., 8 percent of the low-energy Disperse Blue 56 and 3 percent of the high-energy Disperse Blue 79 were sorbed. As disperse dyeing is a reversible sorption process, dyes being sorbed can also be de-sorbed if the temperature is high enough to open the fiber structure.

Figure 4:
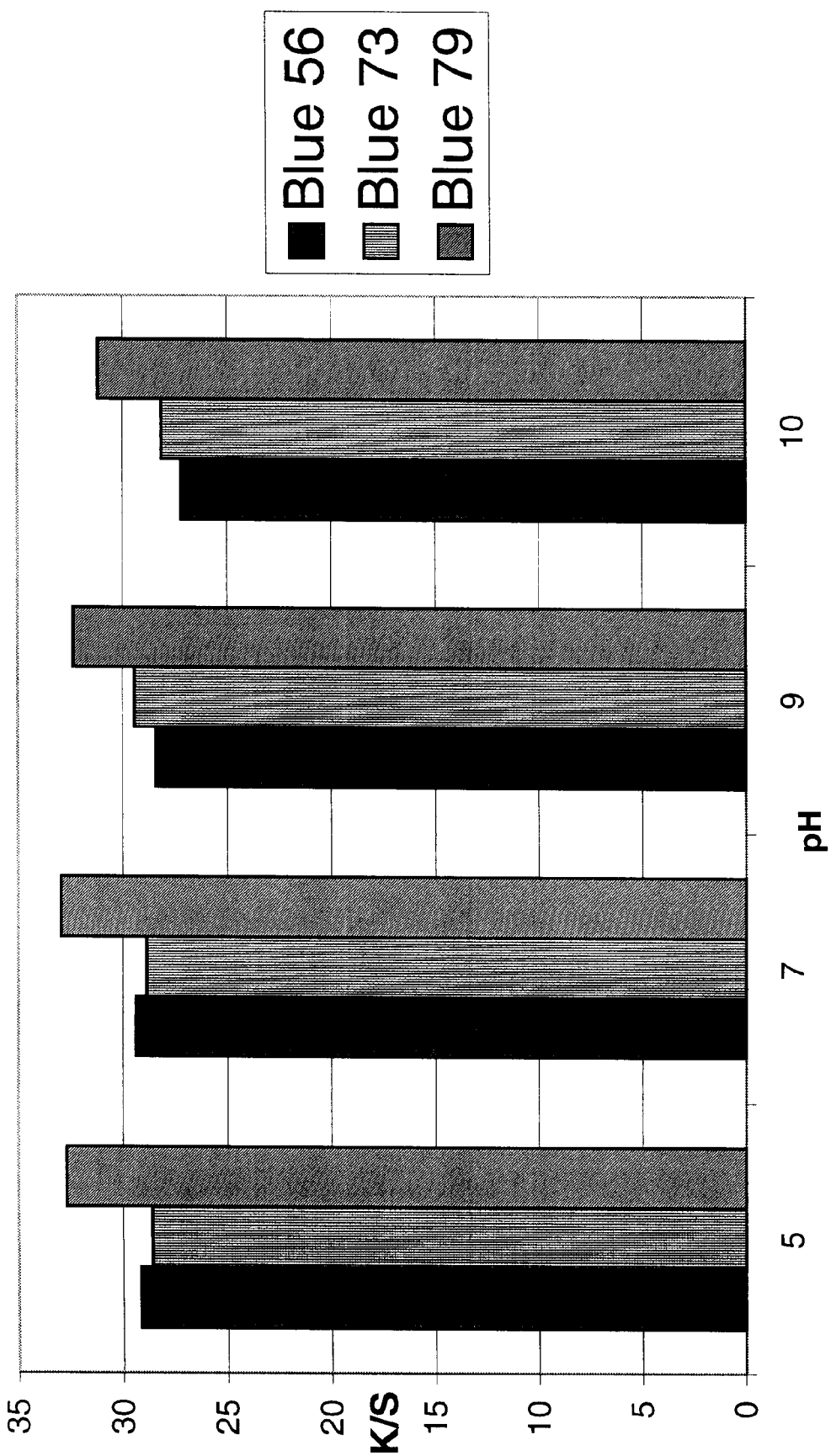
FIG. 4 describes the effect of pH upon low-energy, medium-energy, and high-energy disperse dyeing at 210° F.

FIG. 4 depicts the pH effects upon disperse dyeing at 210° F. This suggests that no pH adjustment is necessary when disperse dyeing the copolyester fibers at the aforementioned preferred temperatures (i.e., less than 212° F.). Interestingly, Disperse Blue 79, a dye that is sensitive to alkaline conditions, showed high stability at about a 10 pH.

Table 1 (below) describes laundering colorfastness of copolyester fabric dyed with low-energy, medium-energy, and high-energy disperse dyes at different shade depths (i.e., 0.5%, 1.2%, and 3.0% dye owf). As might be expected by one having ordinary skill in the art, wash fastness decreased with increasing shade depth and the high-energy dyes had better wash fastness than low-energy dyes.

In Tables 1 and 2 (below), MTCC Method 61-2A (1996), commonly referred to as a 2A wash test, was used to evaluate washfastness. As will be known by those having ordinary skill in the art, Tables 1 and 2 refer to a 1–5 visual rating system, wherein 5 is best and 1 is worst.

TABLE 1

| Disperse Dye | Dye Conc (%) | K/S | Color Change | Multifiber | | | | | |
|---|---|---|---|---|---|---|---|---|---|
| | | | | Acetate | Cotton | Nylon | Polyester | Acrylic | Wool |
| Blue 56 | 0.5 | 9.36 | 4.5 | 3 | 4.5 | 2.5 | 4.5 | 5 | 4 |
| | 1.2 | 19.95 | 4.5 | 2 | 4.5 | 1.5 | 4 | 5 | 3.5 |
| | 3 | 28.31 | 4.5 | 2 | 4 | 1.5 | 4 | 5 | 3 |
| Blue 73 | 0.5 | 10.59 | 4.5 | 4 | 5 | 3 | 5 | 5 | 4.5 |
| | 1.2 | 21.02 | 4.5 | 3 | 4.5 | 2.5 | 4.5 | 5 | 4 |
| | 3 | 28.62 | 4.5 | 2.5 | 4.5 | 2 | 4 | 5 | 3.5 |
| Blue 79 | 0.5 | 7.17 | 4.5 | 5 | 5 | 4.5 | 5 | 5 | 4.5 |
| | 1.2 | 18.89 | 4.5 | 4.5 | 5 | 4 | 4.5 | 5 | 4.5 |
| | 3 | 32.84 | 4.5 | 3.5 | 4.5 | 3.5 | 3.5 | 5 | 4 |

Table 2 (below) describes colorfastness of laundered fabrics dyed at different temperatures. In general, higher dyeing temperatures do not improve wash fastness.

TABLE 2

| Disperse Dye | Dyeing Temp. °F. | K/S | Color Change | Multifiber | | | | | | Crocking | |
|---|---|---|---|---|---|---|---|---|---|---|---|
| | | | | Acetate | Cotton | Nylon | Polyester | Acrylic | Wool | Dry | Wet |
| Blue 56 | PET 265 | 25.45 | 4–5 | 3 | 4–5 | 2 | 4–5 | 5 | 4 | 4–5 | 4–5 |
| | 175 | 28.95 | 4–5 | 2 | 4 | 1–2 | 4 | 5 | 3 | 5 | 5 |
| | 200 | 29.35 | 4–5 | 2 | 4 | 1–2 | 4 | 5 | 3 | 5 | 5 |
| | 220 | 29.16 | 4–5 | 2 | 4 | 1–2 | 4 | 5 | 3 | 5 | 5 |
| | 240 | 28.70 | 4–5 | 2 | 4 | 1–2 | 4 | 5 | 3 | 5 | 5 |
| | 265 | 29.20 | 4–5 | 2 | 4 | 1–2 | 4 | 5 | 3 | 5 | 5 |
| Blue 73 | PET 265 | 24.02 | 4–5 | 3 | 4–5 | 2–3 | 4–5 | 5 | 4 | 4–5 | 4–5 |
| | 175 | 20.97 | | | | | | | 5 | | 4–5 |
| | 200 | 27.81 | 4–5 | 2–3 | 4–5 | 2 | 4 | 5 | 3–4 | 4–5 | 4–5 |
| | 220 | 28.62 | 4–5 | 2–3 | 4–5 | 2 | 4 | 5 | 3–4 | 4–5 | 4–5 |
| | 240 | 29.10 | 4–5 | 2–3 | 4–5 | 1–2 | 4 | 5 | 3–4 | 4–5 | 4–5 |
| | 265 | 29.48 | 4–5 | 2 | 4 | 1–2 | 4 | 5 | 3–4 | 4–5 | 4–5 |
| Blue 79 | PET 265 | 26.63 | 4–5 | 2 | 4 | 3 | 3 | 5 | 3–4 | 4 | 4 |
| | 175 | 23.26 | | | | | | | | 5 | 5 |
| | 200 | 32.94 | 4–5 | 3–4 | 4–5 | 3–4 | 3–4 | 5 | 4 | 5 | 5 |
| | 220 | 32.70 | 4–5 | 3–4 | 4–5 | 3–4 | 3–4 | 5 | 4 | 5 | 5 |
| | 240 | 32.41 | 4–5 | 3–4 | 4–5 | 3–4 | 3–4 | 5 | 4 | 5 | 5 |
| | 265 | 31.14 | 4–5 | 3–4 | 4–5 | 3–4 | 3–4 | 5 | 4 | 5 | 5 |

The copolyester fiber produced according to the present invention had comparable wash fastness to that of conventional polyester fiber (i.e., PET 265). Note, however, that the low-energy disperse dye resulted in poorer wash fastness as compared to the results using the high-energy disperse dye. Accordingly, lower-energy dyes might be better employed where good light fastness is required, but wash fastness is not required (e.g., automotive fabrics). The copolyester fiber had better crock fastness and the conventional polyester fiber in most cases. The copolyester also had better wash-fastness than the conventional polyester when using the high-energy dye Color Index Blue 79

In one particular embodiment, the method of preparing PEG-modified copolyester fibers includes reacting in the melt phase ethylene glycol and a reactant selected from the group consisting of terephthalic acid and dimethyl terephthalate in the presence of polyethylene glycol and a branching agent to form a low molecular weight prepolymer. The prepolymer is then polymerized in the melt phase to form a copolyester composition that has an intrinsic viscosity of at least about 0.73 dl/g and that achieves a zero-shear melt viscosity of at least about 2000 poise when heated to 260° C. In this embodiment, the polyethylene glycol has an average molecular weight of less than about 5000 g/mol and is present in the resulting copolyester composition between about 10 percent and 12 weight percent, and the chain branching agent is present in the resulting copolyester composition in an amount between about 0.0003 and 0.0014 mole-equivalent branches per mole of standardized polymer. Thereafter, the copolyester composition is spun into fibers having a mean tenacity of less than 3 grams per denier. The copolyester fibers are then dyed at a temperature of less than about 240° F., preferably at or below a temperature defined by the boiling point of water at atmospheric pressure (i.e. 212° F.).

As noted, in one aspect the method of preparing PEG-modified copolyester fibers includes copolymerizing polyethylene glycol and chain branching agent into polyethylene terephthalate in the melt phase to form a copolyester composition. The polyethylene terephthalate is present in an amount sufficient for a fiber made from the copolyester composition to possess dimensional stability properties (e.g., shrinkage during home laundering) substantially similar to those of conventional polyethylene terephthalate fibers. The polyethylene glycol, which has an average molecular weight less than about 5000 g/mol, is present in an amount sufficient for fibers made from the copolyester composition to possess wetting, wicking, drying, flame-retardancy, static-dissipation, stretch, and dye uptake properties that are superior to those of conventional polyethylene terephthalate fibers. Open fabric constructions, such as pique knits and low greige yarn density wovens, tend to accentuate moisture movement and stretch performance.

Moreover, it has been further observed that fabrics formed according to the present invention possess significantly improved hand (i.e., tactile qualities) as compared to conventional polyester fabrics made of fibers having similar denier per filament (dpf). In this regard, 1.5 dpf copolyester fibers of the present invention are comparable to 0.6–0.75 dpf conventional polyester fibers.

Figure 5:
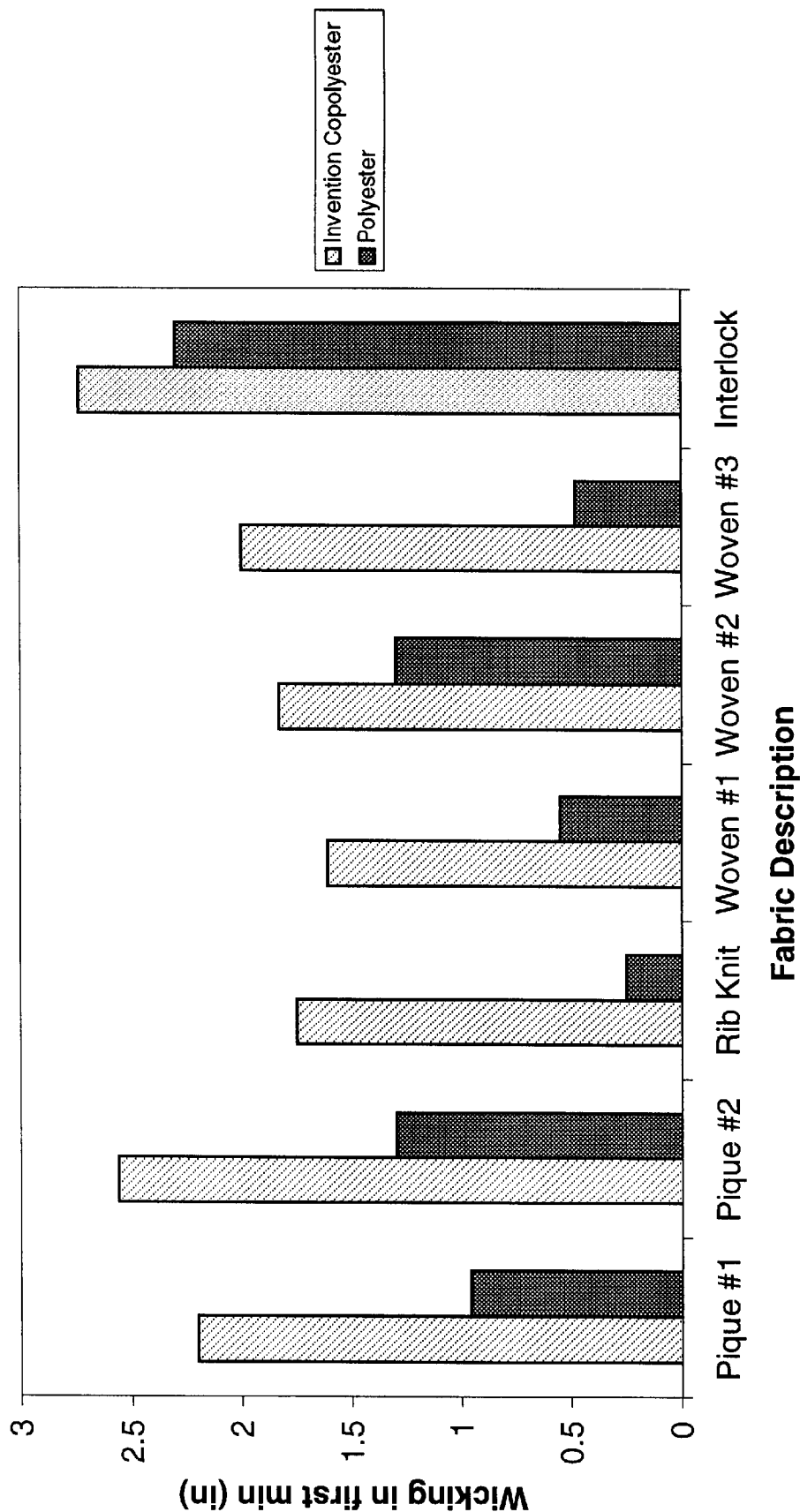
FIG. 5 describes the wicking properties of fabrics formed from copolyester fibers produced according to the invention as compared to the wicking properties of fabrics formed from conventional, unmodified polyethylene terephthalate fibers.

FIG. 5 describes the wicking properties of fabrics formed from copolyester fibers produced according to the invention as compared to the wicking properties of fabrics formed from conventional, unmodified polyethylene terephthalate fibers. As noted, the copolyester fibers included between about 10 and 12 weight percent polyethylene glycol having a molecular weight of about 400 g/mol. Wicking properties were measured using 1"×7" strips that were suspended vertically above water-filled beakers and then submersed one inch below the water surface. After one minute, the water migration up the test strips was measured. The fabrics were tested in both fabric directions and averaged. The test strip fabrics were laundered once before testing. The room conditions were ASTM standard 21° C. and 65 percent relative humidity.

Figure 6:
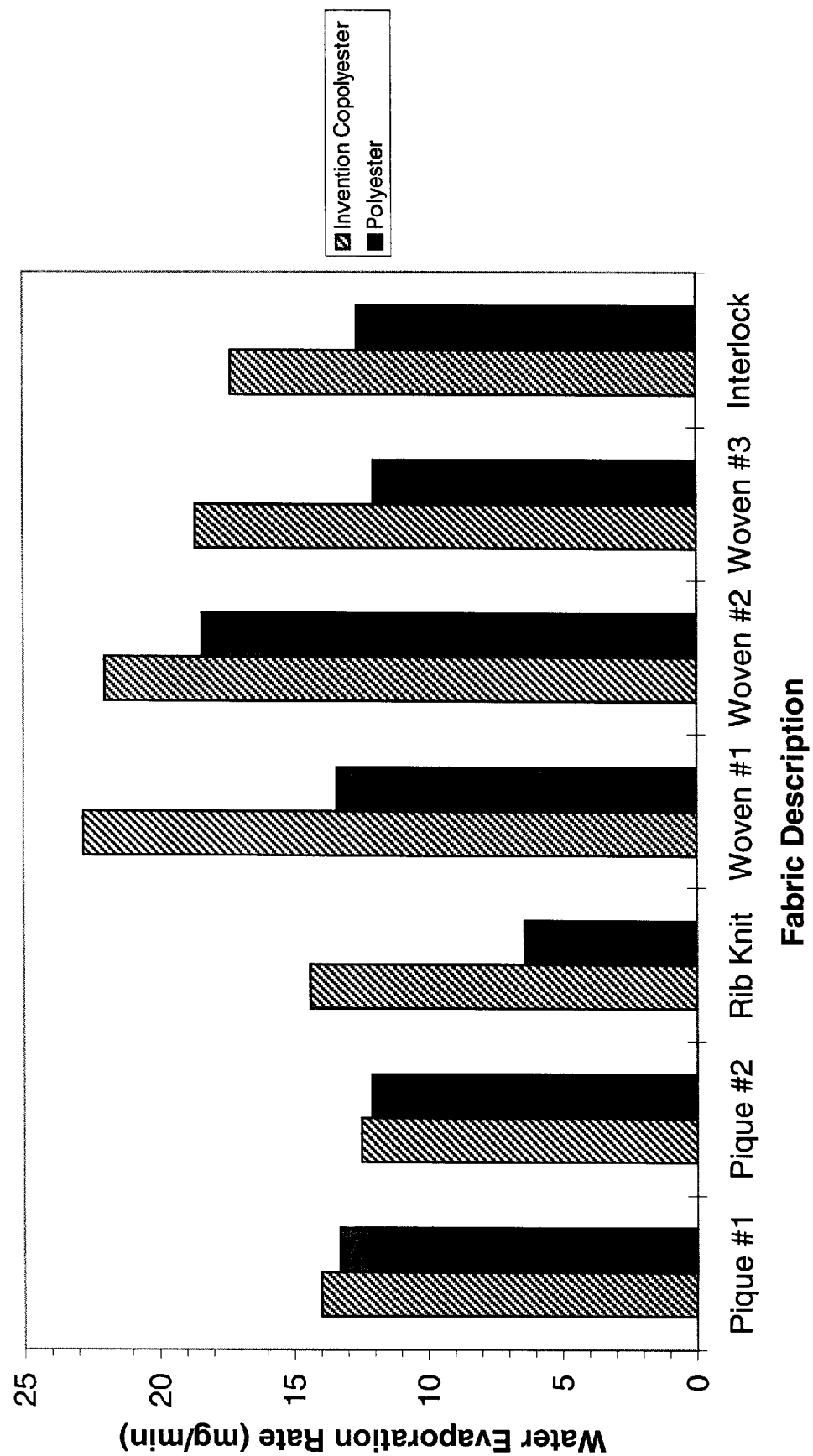
FIG. 6 describes the drying properties of fabrics formed from copolyester fibers produced according to the present invention as compared to the drying properties of fabrics formed from conventional, unmodified polyethylene terephthalate fibers.

FIG. 6 describes the drying properties of fabrics formed from copolyester fibers produced according to the present invention as compared to the drying properties of fabrics formed from conventional, unmodified polyethylene terephthalate fibers. As noted, the copolyester fibers included between about 10 and 12 weight percent polyethylene glycol having a molecular weight of about 400 g/mol. Drying rate was determined using a Sartorius MA30-000V3 at 40° C. Two or three drops of water were placed on the fabrics. Then, the evaporation time was measured and an evaporation rate was calculated. The room conditions were ASTM standard 21° C. and 65 percent relative humidity.

Figure 7:
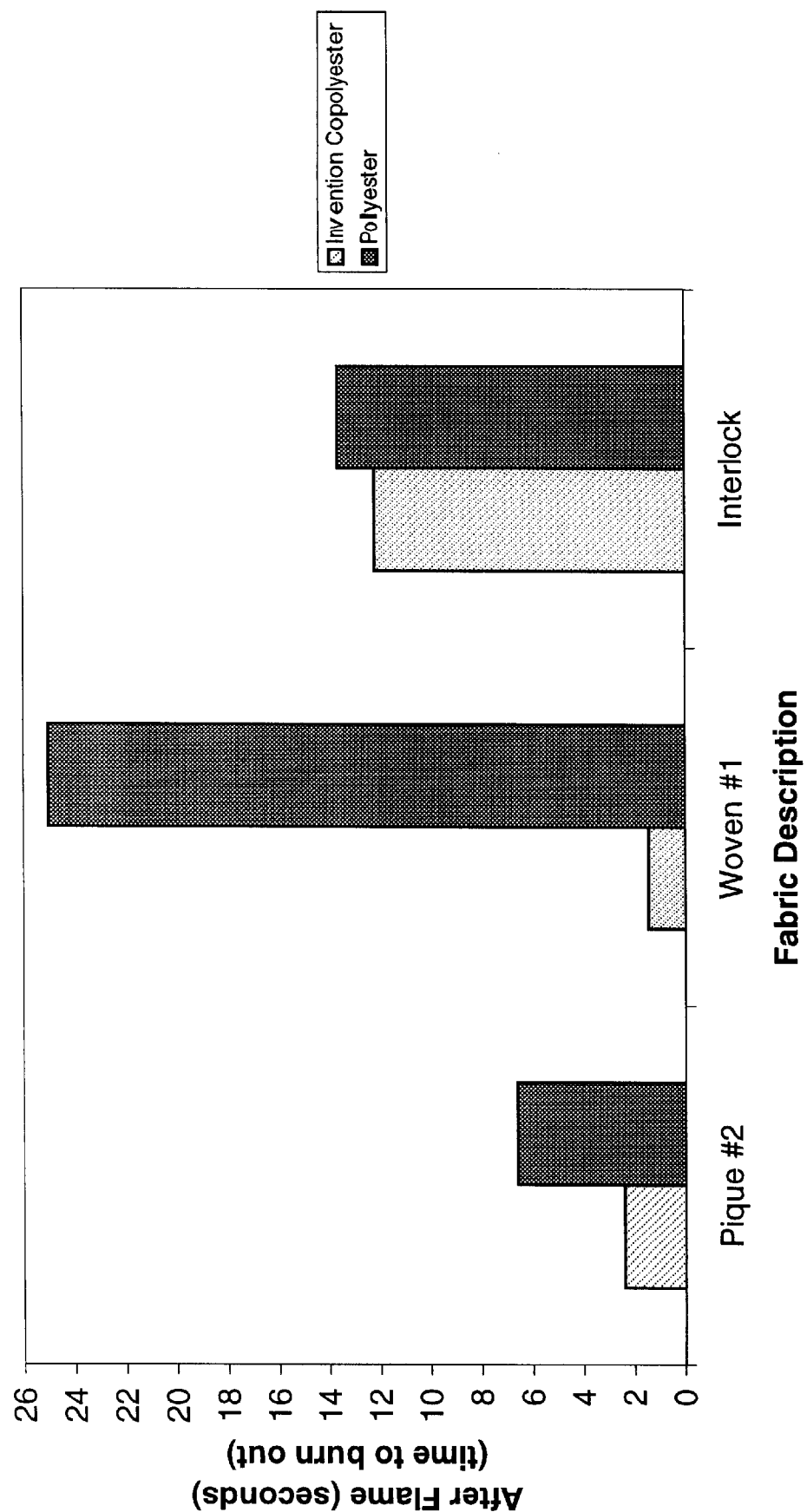
FIG. 7 describes the flame-retardancy properties of fabrics formed from copolyester fibers produced according to the invention as compared to the flame-retardancy properties of fabrics formed from conventional, unmodified polyethylene terephthalate fibers.

FIG. 7 describes the flame-retardancy properties of fabrics formed from copolyester fibers produced according to the invention as compared to the flame-retardancy properties of fabrics formed from conventional, unmodified polyethylene terephthalate fibers. As noted, the copolyester fibers included between about 10 and 12 weight percent polyethylene glycol having a molecular weight of about 400 g/mol. The testing was performed in accordance with the NFPA 701 Method small-scale-after-flame test. FIG. 7 merely shows that fabrics formed from copolyester fibers produced according to the invention have better flame-retardancy properties as compared to those of fabrics formed from conventional, unmodified polyethylene terephthalate fibers. FIG. 7 is not intended to imply that fabrics formed from copolyester fibers produced according to the invention will meet any particular government flammability standards.

Figure 8:
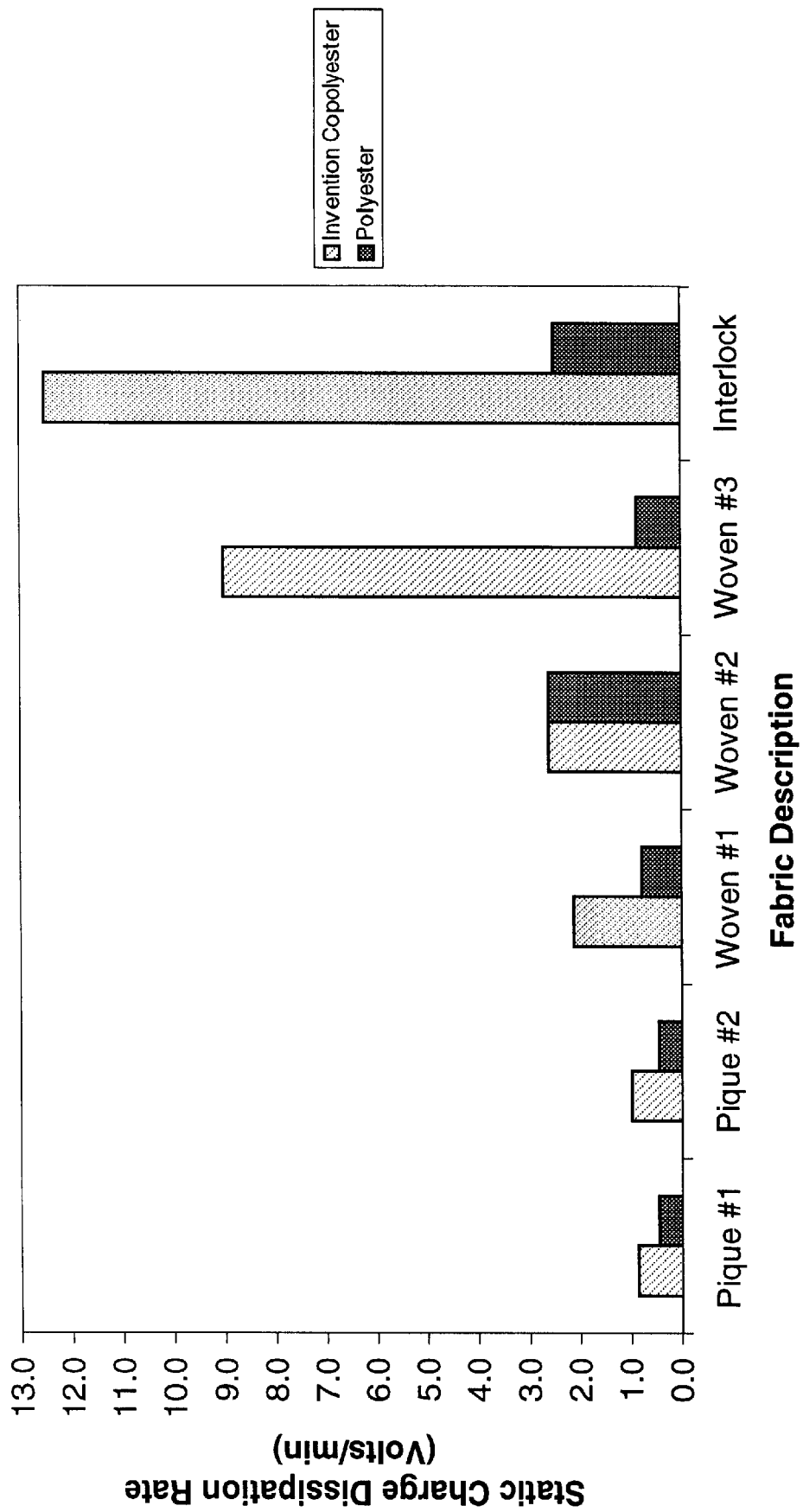
FIG. 8 describes the static-dissipation properties of fabrics formed from copolyester fibers produced according to the invention as compared to the static-dissipation properties of fabrics formed from conventional, unmodified polyethylene terephthalate fibers.

FIG. 8 describes the static-dissipation properties of fabrics formed from copolyester fibers produced according to the invention as compared to the static-dissipation properties of fabrics formed from conventional, unmodified polyethylene terephthalate fibers. As noted, the copolyester fibers included between about 10 and 12 weight percent polyethylene glycol having a molecular weight of about 400 g/mol. Static dissipation was determined using a Rothschild Static-Voltmeter R-4021. In brief, fabric was mounted between the electrodes, and then the time for the voltage across the fabric to reduce from 150 volts to 75 volts was measured. The room conditions were ASTM standard 21° C. and 65 percent relative humidity. As will be understood by those having ordinary skill in the art, a shorter charge half-life is desirable in fabrics because it means fabric static is dissipated faster.

Figure 9:
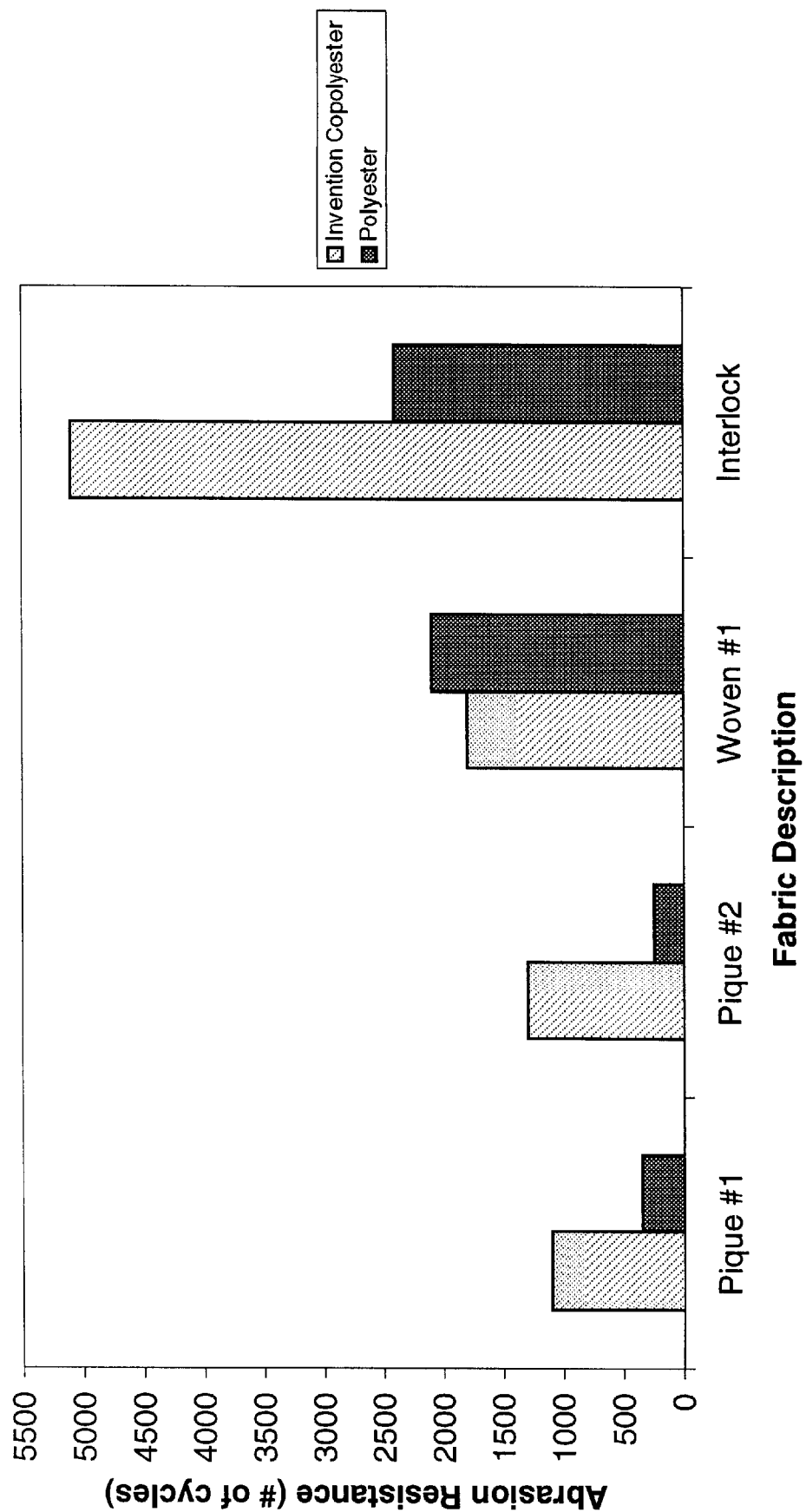
FIG. 9 describes the abrasion resistance properties of fabrics formed from copolyester fibers produced according to the invention as compared to the abrasion resistance properties of fabrics formed from conventional, unmodified polyethylene terephthalate fibers.

FIG. 9 describes the abrasion resistance properties of fabrics formed from copolyester fibers produced according to the invention as compared to the abrasion resistance properties of fabrics formed from conventional, unmodified polyethylene terephthalate fibers. As noted, the copolyester fibers included between about 10 and 12 weight percent polyethylene glycol having a molecular weight of about 400 g/mol. The fabrics each had a TiO2 level of 3000 ppm. Abrasion resistance was determined using Stoll flat (knits) ASTM D 3886 method and Taber (wovens) ASTM D 3884 method.

Figure 10:
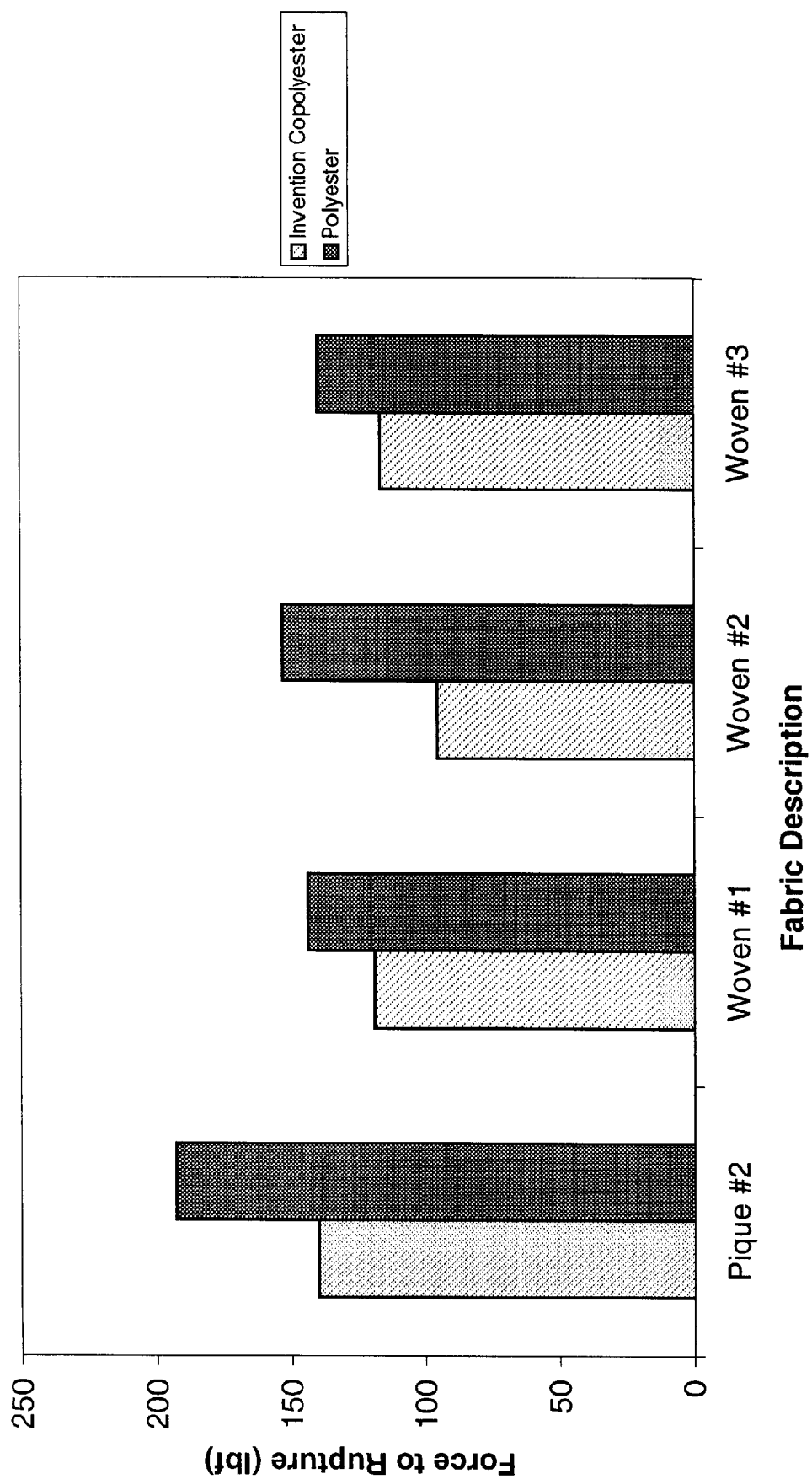
FIG. 10 describes the strength properties of fabrics woven from copolyester fibers produced according to the present invention as compared to the strength properties of fabrics woven from conventional, unmodified polyethylene terephthalate fibers.

FIG. 10 describes the strength properties of fabrics woven from copolyester fibers produced according to the present invention as compared to the strength properties of fabrics woven from conventional, unmodified polyethylene terephthalate fibers. As noted, the copolyester fibers included between about 10 and 12 weight percent polyethylene glycol having a molecular weight of about 400 g/mol. The somewhat weaker strength of fabrics formed from the fibers prepared according to the invention reduces undesirable pilling. Fabric strength was determined by strip test (wovens) ASTM D 1682-64 method or by Ball Burst (knits) ASTM D3787-80A.

Figure 11:
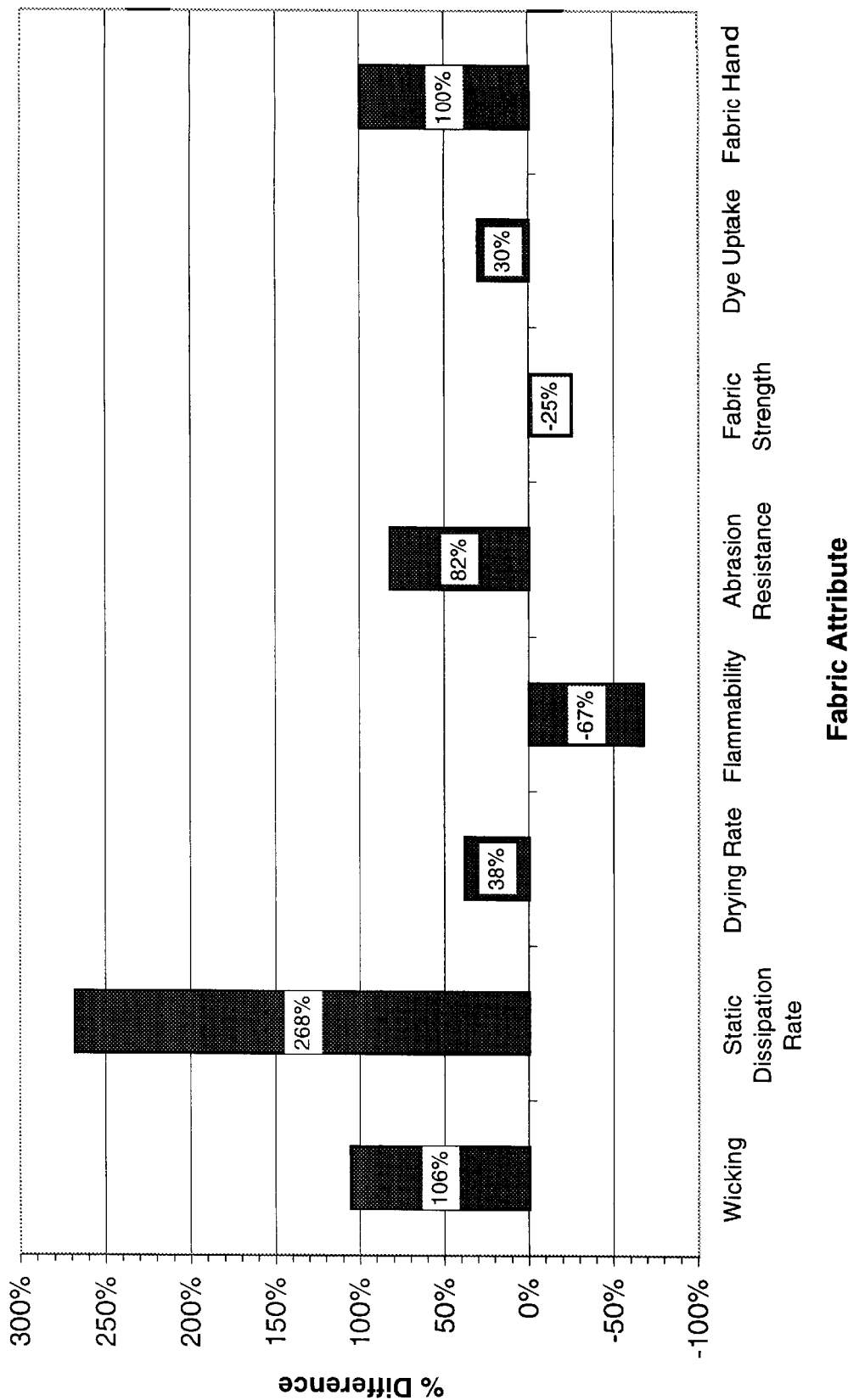
FIG. 11 describes the improved properties of fabrics formed from copolyester fibers produced according to the invention as compared to the properties of fabrics formed from conventional, unmodified polyethylene terephthalate fibers.

FIG. 11 summarizes on a percentage basis the improved properties of fabrics formed from copolyester fibers produced according to the invention as compared to the properties of fabrics formed from conventional, unmodified polyethylene terephthalate fibers. As noted, the copolyester fibers included between about 10 and 12 weight percent polyethylene glycol having a molecular weight of about 400 g/mol. With respect to dye uptake, the 30 percent improvement is based on darker shades. With respect to fabric hand, fabric formed from 1.5 dpf copolyester fibers according to the present invention subjectively feels like fabric formed from 0.75 dpf conventional polyester microfibers.

Preparing PEG-modified copolyester fibers according to the invention not only yields certain improved textile characteristics, but also retains the desirable dimensional stability of ordinary polyester. Despite the significant concentration of polyethylene glycol, copolyester fibers prepared according to the invention have dimensional stability properties, especially shrinkage during home laundering, that are substantially similar to those of conventional polyethylene terephthalate fibers. For example, conventional polyester fabric exhibits less than about five percent shrinkage in home laundering if finished at a temperature at or above 350° F. Similarly, copolyester fabric of the invention exhibits less than about five percent shrinkage in home laundering if finished (i.e., heat set) at a fabric temperature at or above 330° F. This is about the expected home laundering shrinkage of conventional polyester fabrics.

Moreover, fabrics formed from the filaments spun according to the invention will possess better elastic-memory properties (i.e., stretch and recovery) as compared to fabrics formed from conventional polyethylene terephthalate filaments.

The commonly-assigned patent application Ser. No. 09/141,665 discloses that chain branching agents can raise the melt viscosity of PEG-modified copolymer melt to within the range of normal, unmodified polyethylene terephthalate. In contrast, the present invention introduces an alternative method of producing fibers from PEG-modified copolyester without resorting to significant fractions of branching agent.

In accordance with this aspect of the invention, chain branching agent is present in the copolyester composition in an amount less than about 0.0014 mole-equivalent branches per mole of standardized polymer, and preferably between about 0.0003 and 0.0014 mole-equivalent branches per mole of standardized polymer.

As used herein, the term "mole-equivalent branches" refers to the reactive sites available for chain branching on a molar basis (i.e., the number of reactive sites in excess of the two required to form a linear molecule). For example, pentaerythritol is a tetrafunctional branching agent, so it possesses two available chain branching reactive sites.

In addition, as used herein, the term "standardized polymer" refers to the repeat unit of unmodified polyethylene terephthalate, which has a molecular weight of 192 g/mol. In this regard, it will be understood by those of skill in the art that, for a given total weight of polyethylene terephthalate, polyethylene glycol, and branching agent, increasing the relative weight fraction of polyethylene glycol, which preferably has a molecular weight of less than 5000 g/mol, will decrease total moles. (This is so because the molecular weight of polyethylene terephthalate is less than the molecular weight of the polyethylene glycol.) Consequently, to maintain uniformity across various concentrations and molecular weights of polyethylene glycol, the chain branching agent concentration of between about 0.003 and 0.0014 mole-equivalent branches per mole of standardized polymer is based on the repeat unit of unmodified polyethylene terephthalate.

In other words, the weight fraction of branching agent should be calculated as if the polymer is made of only unmodified polyethylene terephthalate. Consequently, the weight fraction of polyethylene glycol (e.g., preferably between about 4 weight percent and 20 weight percent) and the molecular weight of the polyethylene glycol (e.g., preferably less than about 5000 g/mol) can be disregarded in calculating mole-equivalent branches per mole of standardized polymer.

For example, an amount of pentaerythritol between about 0.0003 and 0.0014 mole-equivalent branches per mole of the copolyester composition is equivalent to a weight fraction of between about 110 and 500 ppm when based on the standardized polymer of unmodified polyethylene terephthalate, whose repeat unit has a molecular weight of about 192 g/mol.

To further illustrate this relationship, assume 1000 grams of starting materials—500 ppm pentaerythritol, which has a molecular weight of 136.15 g/mol, and the remainder polyethylene terephthalate. This is equivalent to 0.5 gram pentaerythritol, or 0.00367 moles of pentaerythritol, and 999.5 grams polyethylene terephthalate, or 5.21 moles polyethylene terephthalate repeat units. The mole fraction of pentaerythritol relative to the polyethylene terephthalate is, therefore, 0.0705 mole percent (i.e., 0.00367 moles of pentaerythritol ÷5.21 moles polyethylene terephthalate). As noted, pentaerythritol has two available chain branching reactive sites. Thus, the mole-equivalent branches per mole of unmodified polyethylene terephthalate is 0.14 percent (i e., 0.0014 mole-equivalent branches per mole of standardized polymer.)

The weight traction corresponding to mole-equivalent branches per mole of standardized polymer can be estimated for any branching agent using the following equation:

$$\text{branching agent (ppm)}=(MEB \div CBRS) \cdot (BAMW \div SPMW) \cdot 10^6,$$

wherein
MEB=mole-equivalent branches per mole of standardized polymer
CBRS=number of available chain branching reactive sites
BAMW=molecular weight of the branching agent (g/mol)
SPMW=192 g/mol—molecular weight of the standardized polymer (i.e., unmodified polyethylene terephthalate)

It will be appreciated by those of skill in the chemical arts that if the mole-equivalent branches were not referenced to a mole of standardized polymer, a branching agent concentration of 0.0014 mole-equivalent branches per mole of polymer (i.e., the copolyester composition) would translate to a slightly lower weight fraction, (i.e., ppm), when a greater polyethylene glycol weight fraction is used, or when polyethylene glycol having a higher average molecular weight is employed.

For example, if mole-equivalent branches per mole of polymer were not related to a common standard, but rather to the actual components of the copolyester composition, an amount of pentaerythritol less than about 0.0014 mole-equivalent branches per mole of the copolyester composition would be equivalent to a weight fraction of less than about 450 ppm when based on polyethylene terephthalate that is modified by 20 weight percent polyethylene glycol having an average molecular weight of about 400 g/mol. Likewise, an amount of pentaerythritol less than about 0.0014 mole-equivalent branches per mole of the copolyester composition would be equivalent to a weight fraction of less than about 400 ppm when based on polyethylene terephthalate that is modified by 20 weight percent polyethylene glycol having an average molecular weight of about 5000 g/mol. By employing unmodified polyethylene terephthalate as the standardized polymer, however, an amount of pentaerythritol less than about 0.0014 mole-equivalent branches per mole of standardized polymer is equivalent to a weight fraction of less than about 500 ppm regardless of the weight fraction or molecular weight of the polyethylene glycol.

The chain branching agent is preferably a trifunctional or tetrafunctional alcohol or acid that will copolymerize with polyethylene terephthalate. As will be understood by those skilled in the art, a trifunctional branching agent has one reactive site available for branching and a tetrafunctional branching agent has two reactive sites available for branching. Acceptable chain branching agents include, but are not limited to, trimesic acid ($C_6H_3(COOH)_3$), pyromellitic acid ($C_6H_2(COOH)_4$), pyromellitic dianhydride, trimellitic acid, trimellitic anhydride, trimethylol propane ($C_2H_5C(CH_2OH)_3$), ditrimethylol propane ($C_2H_5C(CH_2OH)_2C_2H_4OC(CH_2OH)_2C_2H_5$), dipentaerythritol ($CH_2OHC(CH_2OH)_2C_2H_4OC(CH_2OH)_2CH_2OH$), and preferably pentaerythritol ($C(CH_2OH)_4$). If the total number of reactive sites exceeds four per branching agent molecule, steric hindrance can sometimes prevent full polymerization at the available reactive sites such that more branching agent may be required to achieve the desired mole-equivalent branches. See, e.g., U.S. Pat. Nos. 4,092,299 and 4,113,704 by MacLean and Estes.

In another aspect, the invention is a polyethylene glycol modified copolyester composition that is particularly suitable for fibers. The copolyester composition includes polyethylene terephthalate in an amount sufficient for a fiber made from the composition to possess dimensional stability properties substantially similar to those of conventional, unmodified polyethylene terephthalate fibers. The polyethylene glycol in an amount sufficient for a fiber made from the composition to possess wicking, drying, and static-dissipation properties that are superior to those of conventional, unmodified polyethylene terephthalate fibers, wherein the polyethylene glycol has an average molecular weight of less than about 5000 g/mol. The chain branching agent selected from the group consisting of trifunctional alcohols, trifunctional acids, tetrafunctional alcohols, tetrafunctional acids, pentafunctional alcohols, pentafunctional acids, hexafunctional alcohols, and hexafunctional acids that will copolymerize with polyethylene terephthalate, wherein the chain branching agent is present in said composition in an amount less than about 0.0014 mole-equivalent branches per mole of standardized polymer, the standardized polymer being unmodified polyethylene terephthalate. The weight fraction of polyethylene glycol in said composition and the intrinsic viscosity of said composition are defined by the shaded region of FIG. 1.

In a preferred embodiment, the weight fraction of polyethylene glycol in the composition is between about 10 and 12 percent, and the composition has an intrinsic viscosity of between about 0.73 and 0.88 dl/g. To facilitate spinning, the copolyester composition is preferably achieves a zero-shear melt viscosity of between about 2000 and 3500 poise when heated to 260° C. As previously disclosed, in another embodiment, the copolyester composition is comprised of polymer chains formed from structural units consisting essentially of diol monomers, aromatic non-substituted diacid monomers, and branching agent monomers.

A distinct advantage of the present method is that it produces a copolyester fiber that, while possessing wetting, wicking, drying, soft hand, dye uptake, flame-retardancy, abrasion-resistance, stretch, and static-dissipation properties that are superior to those of conventional polyethylene terephthalate fibers, can be processed using conventional textile equipment. For example, in one broad aspect, the PET-modified copolyester can be spun into partially oriented yarns (POY). As will be understood by those having ordinary skill in the art, POY is often comprised of from tens to hundreds of intermingled filaments (e.g., between 30 and 200) that are extruded from a spinneret at speeds typically between about 2000 and 4000 meters per minute. The POY is then typically drawn to form a drawn yarn, (e.g., by draw texturing, flat drawing, or warp drawing). Thereafter, the drawn yarn is formed into fabric, which is typically finished as well. As will be known by those skilled in the art, texturing POY can be effected in numerous ways, such as air jet texturing, gear crimping, and false-twist texturing. More generally, copolyester fibers of the present invention (i.e., staple or POY) may be textured according to various techniques, such as air jet, edge crimping, false-twist, gear crimping, knit-de-knit, and stuffer box methods.

Table 3 (below) discloses an exemplary set point and preferred set point ranges for texturing the copolyester POY using a contact falsetwist texturing machine.

TABLE 3

| Contact Heater False-Twist Texturing Set Points | | Range |
|---|---|---|
| Models | Barmag L-80; Barmag RPR 3SD90 | |
| Draw Ratio | 1.55 | 1.3–2.0 |
| Primary Heat (° C.) | 130 | 100–190 |
| Speed (m/min) | 500 | 300–800 |
| Secondary Heat (° C.) | 160° C. | Off-190 |
| D/Y ratio | 1.7 | 1.3–2.0 |
| PU Disk stacking (S-PU-S) | 2–5–1 | |
| PU = polyurethane, S = stainless steel | 3–4–1 | |
| % Takeup Overfeed | 6 | 2–14 |
| Pre-aggregate tension (g) | 63 | 30–80 |
| Post-aggregate tension (g) | 36 | 20–70 |
| Twist | S or Z | all S and Z combinations |
| Takeup Tension (g) | <6 | 4–20 |
| Denier | 60–525 | |
| Tenacity (g/denier) | 1.65 | 1.4–3.0 |
| % Elongation | 30–35 | 15–75 |
| % Shrinkage | 4–4.5 set or ~7 stretch | 2–20 |
| % Crimp | 3–5 set or ~16 stretch | 2–30 |
| % Bulk | 7–10 set or ~24 stretch | 5–40 |

Table 4 (below) discloses an exemplary set point and preferred set point ranges for texturing the copolyester POY using a non-contact false-twist texturing machine.

TABLE 4

| Non-Contact Heater False-Twist Texturing Set Points | | Range |
|---|---|---|
| Models | Barmag AFK; Rieter Scragg | |
| Draw Ratio | 1.58 | 1.3–2.0 |
| Primary Heat ($1^{st}/2^{nd}$) (° C.) | 300/220 | 100–190 |
| Speed (m/min) | 500 | 300–800 |
| Secondary Heat for set yarn (° C.) | 160 | Off-190 |
| D/Y | 1.7 | 1.3–2.0 |
| PU Disk stacking (S-PU-S) | 1–7–1 | |
| PU = polyurethane, S = stainless steel | | |
| % Takeup Overfeed | 4.5 | 2–14 |
| Pre-aggregate tension (g) | 65 | 30–80 |
| Post-aggregate tension (g) | 42 | 20–70 |
| Takeup Tension (g) | 10 | 4–20 |
| Denier | 60–525 | |
| Tenacity (g/denier) | 2.3 | 1.2–3.0 |
| % Elongation | 63 | 15–75 |
| % Shrinkage | 4.3 set or ~7 stretch | 2–20 |
| % Crimp | 3–6 set or ~16 stretch | 2–30 |
| % Bulk | 7–10 set or ~24 stretch | 5–40 |

Table 5 (below) discloses an exemplary set point and preferred set point ranges for draw-winding the copolyester POY using a draw-winding machine with heated godet rolls.

TABLE 5

| Draw-Winding Set Points | | Range |
| --- | --- | --- |
| Models | Barmag | |
| Draw Ratio | 1.85 | 1.5–2.2 |
| Primary Heat (° C.) | 60 | 100–190 |
| Speed (m/min) | 500 | 300–800 |
| Secondary Heat for set yarn (° C.) | 140 | Off–190 |
| Denier | 60–1100 | |
| Tenacity (g/denier) | 2.9 | 1.2–3.0 |
| % Elongation | 60 | 15–75 |
| % Shrinkage | 3.2 set or ~7 stretch | 2–20 |

As will be understood by those having ordinary skill in the art, in Tables 3–5 (above) "dinier" depends on the POY dinier and number of piles, and "secondary heat" applies to set yarns. Moreover, "D/Y" is the ratio of disk speed to yarn speed, wherein the disk speed the linear speed the linear speed of a point on the circumference of the disk. It is re-emphasized that the disclosed settings (above) are exemplary rather than limiting, and that when the filament of the present invention is textured on another kind of machinery, those of ordinary skill in the art will be able to replicate the results described herein without undue experimentation.

It should be noted that flat drawn POY produced according to the invention results in yarns having dyeing characteristics similar to those of cellulose acetate yarns. These copolyester yarns are especially suitable for producing suit linings. As will be known to those having ordinary skill in the art, suit linings are conventionally jig dyed using low-energy dyes, which have poor fastness properties. The yams and fabric formed according to the invention, however, can be dyed on conventional jig dyeing equipment using high-energy dyes. Such yarns and fabrics are machine washable, which is not possible with acetate products.

Because of the characteristic advantages that the invention brings to the polyester compositions described herein, the resulting polyester fibers are particularly useful in blended yarns and blended fabrics. Accordingly, copolyester POY can be blended with at least one other kind of fiber (i.e., a fiber having a different chemical composition or having been differently processed) to form a blended yarn. As will be understood by those familiar with textile processes, the copolyester POY is typically either draw textured to form a draw-textured yarn (DTY) or flat drawn to form a flat-drawn yarn (i.e., a hard yam) before blending. The drawn copolyester yarn is especially suitable for blending with cotton fibers, rayon fibers, polypropylene fibers, acetate fibers, nylon fibers, spandex fibers, and conventional polyester fibers.

Furthermore, the drawn copolyester yarn (e.g., DTY or hard yarn) can also be blended with a least one other kind of fiber to form blended fabric. In this regard, the drawn copolyester yarn is especially suitable for blending with cotton fibers, rayon fibers, polypropylene fibers, acetate fibers, nylon fibers, spandex fibers, conventional polyester fibers, and even copolyester staple fibers of the present invention. It will be understood that, as used herein, the concept of forming a blended fabric from the drawn copolyester yarn and at least one other kind of fiber not only includes directly forming a fabric from the drawn copolyester yarn and a second kind of fiber, but also includes first forming a blended yarn before forming the blended fabric. In either case, however, the blended fabric is formed from a drawn copolyester yarn and a second kind of fiber.

As will be known to those skilled in the art, two different kinds of filaments are not usually textured together unless they can use the same temperature and draw ratio. Consequently, it is desirable to form a blended fabric without first forming a blended yam when the second kind of fiber has different texturing requirements than those of the copolyester POY.

It has been observed, however, that the copolyester POY and nylon yarn require similar texturing temperatures. Accordingly, in a preferred embodiment, the copolyester POY and a nylon yarn are formed into a blended yarn. Thereafter, the blended yarn is textured. Interestingly, because of dye selectivity, the resulting blended yarn may be dyed with disperse dye, which preferentially dyes the copolyester component, and acid-based dye, which preferentially dyes the nylon component. In this way, a heather yarn (or a two-colored yarn) can be produced, which may then be formed into an attractive, heather fabric (or a two-colored fabric).

In another broad aspect, the invention further includes cutting the copolyester filaments into staple fibers. As will be understood by those having ordinary skill in the art, perhaps thousands of filaments can be spun from a single spinneret, typically at speeds of between about 500 and 2000 meters per minute. The filaments, often from numerous spinneret positions, are combined into a tow. The tow is often crimped before the filaments are cut into staple fibers.

The staple fibers can be formed into yarn using any conventional spinning technique, such as ring spinning, open-end spinning, and air jet spinning. In this regard, open end and air jet spinning are becoming increasingly more preferred for polyester yarns, as well as for blended yarns containing polyester. The yarns formed from the copolyester filaments of the invention, in turn, can be woven or knitted into fabrics that have the advantageous characteristics referred to herein. Alternatively, the staple fibers can be formed directly into a non-woven fabric. As used herein, the concept of forming staple fibers into fabric includes first forming a yarn, (e.g., knitting and weaving), in addition to forming the staple fibers directly into fabric, (e.g., non-woven fabric).

In another aspect, the method includes blending the staple copolyester fibers with at least a second kind of fiber, such as cotton fibers, rayon fibers, polypropylene fibers, acetate fibers, nylon fibers, spandex fibers, and conventional unmodified polyester fibers. In this regard, acetate fibers and spandex fibers are usually in filament form. Thereafter, the staple fibers and the second kind of fiber can be spun into yarn, and the yarn formed into fabric using conventional techniques. Alternatively, the staple fibers and the second kind of fiber can be formed directly into a non-woven fabric.

In yet another aspect, the invention includes forming copolyester fibers from the copolyester composition as previously disclosed, and then blending the copolyester fibers with spandex fibers. As described previously, the term "copolyester fiber" broadly refers to uncut filament (e.g., POY, flat-drawn yarn, or textured yarn) and cut fiber (e.g., staple fiber).

For example, the copolyester fibers and the spandex fibers can be blended into yarn. In one preferred embodiment, this comprises core spinning copolyester staple fibers around a core of spandex filaments. Likewise, in another preferred embodiment, the copolyester filaments—preferably in the form of POY—are wrapped around spandex filaments.

The copolyester fibers and the spandex fibers may also be formed into fabric using conventional techniques. For example, the fabric may be formed, (e.g., woven or knitted), from a blended yarn that is spun from the copolyester fibers and the spandex fibers. Alternatively, the copolyester fibers and spandex fibers may be directly formed into a fabric, preferably a knit fabric. To accomplish this, the spandex is laid into a copolyester knit by employing an appropriate knitting machine attachment.

As noted previously, the invention can include dyeing the copolyester fibers at a temperature of less than about 240° F. In particular, this reduction in dyeing temperature not only reduces energy usage, but also permits copolyester fibers that are produced according to this embodiment of the invention to be more effectively combined with spandex filaments. Blended yarns and fabrics that are made from PEG-modified copolyester fibers—preferably staple fibers or POY—and spandex fibers can be dyed at temperatures of less than about 240° F., and yet can achieve excellent fastness and depth of color. In one preferred embodiment, the spandex fibers and the copolyester fibers may be dyed at a temperature of less than about 230° F. In another preferred embodiment, the spandex fibers and the copolyester fibers may be dyed at a temperature of less than about 220° F. In yet another preferred embodiment, the spandex fibers and the copolyester fibers may be dyed at or below a temperature of less than the boiling point of water at atmospheric pressure (i.e., 212° F. or 100° C.). In this regard, it should be understood that the concept of dyeing copolyester fibers and spandex fibers includes dyeing the blend in the form of blended yarns and blended fabrics. It is emphasized that, as used herein, the term "copolyester fibers" broadly refers to cut copolyester fibers, (e.g., staple fibers), and uncut copolyester filaments, (e.g., POY).

Dyeing copolyester fibers and spandex fibers at reduced temperatures prevents the degradation of the stretch properties possessed by spandex. In conventional polyester-spandex blended textiles, dyeing temperatures of about 265° F. are required to adequately dye the conventional polyester fibers. Unfortunately, such high temperatures weaken such high-power stretch polyurethane filaments. Consequently, dyeing blends of copolyester and spandex at lower temperatures is advantageous.

In other embodiments of the method, copolyester fibers, whether staple fibers or POY, are blended with cotton fibers. The preferred copolyester/cotton blends include between about 5 percent and 95 weight percent cotton fibers with the remainder comprising the copolyester fibers. Most preferably, the blend includes between about 30 weight percent and 70 weight percent cotton fibers with the remainder comprising the polyester fibers. In this regard, the invention provides the opportunity to increase the synthetic content of blended cotton and polyester yarns to take advantage of the desirable characteristics of the copolyester in the resulting yarns and fabrics. For example, unlike conventional unmodified polyester fibers, the copolyester fibers formed according to the present method possess static-dissipation properties that are closer to that of cotton. Moreover, the present copolyester fibers retain the desirable dimensional stability characteristics of conventional polyesters.

A particular advantage of the present invention is that copolyester fibers and cotton fibers can be dyed in one step, which is expected to reduce dyeing and energy expenditures by 30 percent or more. As will be understood by those of ordinary skill in the art, cotton is typically dyed using cotton dyes (e.g., reactive dyes) in alkaline dye baths and polyester is typically dyed at high temperatures (e.g. 265° F.) in acidic dye baths. Accordingly, dyeing blended cotton and polyester yarns and fabrics requires a two-step dyeing process. Such blends are usually dyed in an alkaline pH using suitable cotton dyes to selectively dye the cotton fibers and are thereafter dyed in an acidic pH using disperse dyes to selectively dye the polyester fibers. As described previously, however, the present copolyester fibers do not require any pH adjustment and can be dyed effectively in an alkaline dye bath having a pH as high as 10. Consequently, blended yarns and fabrics that are made from PEG-modified copolyester fibers and cotton fibers can be dyed simultaneously in an alkaline dye bath that includes both reactive and disperse dyes. Preferably, dyeing such cotton/copolyester blends is carried out in a dye bath having a pH of about 10 or less and a temperature at or below the boiling point of water at atmospheric pressure (i.e., 212° F. or 100° C.). It should be understood that the concept of dyeing copolyester fibers and cotton fibers includes dyeing the blend in the form of blended yarns and blended fabrics.

It is re-emphasized that, as used herein, the term "copolyester fibers" broadly refers to cut copolyester fibers, (e.g., staple fibers), and uncut copolyester filaments, (e.g., POY). It is further emphasized that this one-step dyeing technique can be employed effectively with other blends of copolyester fibers and cellulosic fibers, such as rayon and acetates Those familiar with textile terminology will understand that "spinning" refers to two different processes. In one sense, the term "spinning" refers to the production of synthetic polymer filaments from a polymer melt. In its older, conventional use, the term "spinning" refers to the process of twisting a plurality of individual fibers into yarns. The use of both of these terms is widespread and well understood in this art such that the particular use herein should be easily recognized by those of ordinary skill in the art.

Conventional techniques of polymerizing polyester and spinning filaments are well known by those having ordinary skill in the art. Accordingly, the following examples highlight the modifications to conventional process steps to achieve an especially desirable fabric.

EXAMPLE 2

Melt Polymerization—The copolyester composition was polymerized like standard polyethylene terephthalate, except that the polymerization temperature was 10° C. lower than normal. Polyethylene glycol, having an average molecular weight of 400 g/mole, was injected into the process before the initiation of the polymerization at a rate sufficient to yield 10 weight percent polyethylene glycol in the copolyester composition. Likewise, pentaerthyritol was added before polymerization at a rate that would yield about 400 ppm in the copolyester composition. The copolyester was then extruded, quenched, and cut. The quench water was 10° C. colder than normal. The copolyester was crystallized 10° C. lower than normal. The copolyester was melt polymerized to an intrinsic viscosity of 0.78 dl/g.

Filament Spinning—The copolyester formed POY like a conventional polyethylene terephthalate product having the same filament count, except that the spinning temperature was reduced by 10° C.

Texturin—The POY was textured on a non-contact heater Barmag AFK false twist texturing machine with polyurethane disks. The POY processed like standard polyethylene terephthalate POY except that the temperature was between about 50° C. and 100° C. below normal primary-heater temperatures. Finally, the secondary heater was not used, yielding a stretch textured yarn.

Fabric Formation—Fabric formation was identical to conventional weaving and knitting techniques.

Dyeing—Dyeing was the same as conventional techniques except that no carrier was used and the batch was held at a dye temperature of 210° F. for 30 minutes. The heat-up rate was held to 2° F. per minute between 110° F. and 210° F. to ensure level dyeing.

Finishing—Finishing was the same as conventional techniques except that the zone temperature was reduced 10° C. and no finish was used in the pad.

EXAMPLE 3

The copolyester composition was processed in accordance with Example 1, except for the following texturing modification.

TexturinG—The POY was textured on a non-contact heater Barmag AFK false twist texturing machine with polyurethane disks. The POY processed like standard polyethylene terephthalate POY except that the temperature was between about 50° C. and 100° C. below normal primary-heater temperatures. Finally, the secondary heater at 160° C. was used to yield a set textured yarn.

Fabric Formation—Fabric formation was identical to conventional knitting techniques.

In the drawings and the specification, typical embodiments of the invention have been disclosed. Specific terms have been used only in a generic and descriptive sense, and not for purposes of limitation. The scope of the invention is set forth in the following claims.

That which is claimed is:

1. A method of preparing polyethylene glycol modified copolyester fibers that can be formed into exceptionally comfortable fabrics, comprising:

copolymerizing polyethylene glycol and a chain branching agent into polyethylene terephthalate in the melt phase to form a copolyester composition that comprises polymer chains formed from structural units consisting essentially of diol monomers, aromatic non-substituted diacid monomers, and branching agent monomers, and that has an intrinsic viscosity of at least about 0.67 dl/g;

wherein the polyethylene terephthalate is present in the copolyester composition in an amount sufficient for a fiber made from the copolyester composition to possess dimensional stability properties substantially similar to those of conventional, unmodified polyethylene terephthalate fibers;

wherein the polyethylene glycol has an average molecular weight of less than about 5000 g/mol and is present in an amount sufficient for a fiber made from the copolyester composition to possess wicking, drying, and static-dissipation properties that are superior to those of conventional, unmodified polyethylene terephthalate fibers; and wherein the chain branching agent is present in the copolyester composition in an amount between about 0.0003 and 0.0014 mole-equivalent branches per mole of standardized polymer, the standardized polymer being unmodified polyethylene terephthalate; and thereafter spinning the copolyester composition into a filament.

2. A method of preparing copolyester fibers according to claim 1, wherein the weight fraction of polyethylene glycol in the copolyester composition is between about 4 percent and 20 percent.

3. A method of preparing copolyester fibers according to claim 1, wherein the weight fraction of polyethylene glycol in the copolyester composition is between about 8 percent and 14 percent.

4. A method of preparing copolyester fibers according to claim 1, wherein the weight fraction of polyethylene glycol in the copolyester composition is between about 10 percent and 12 percent.

5. A method of preparing copolyester fibers according to claim 4, wherein the step of copolymerizing polyethylene glycol and a chain branching agent into polyethylene terephthalate comprises copolymerizing polyethylene glycol and a chain branching agent into polyethylene terephthalate in the melt phase to form a copolyester composition that achieves a zero-shear melt viscosity of between about 2000 and 3500 poise when heated to 260° C.

6. A method of preparing copolyester fibers according to claim 1, wherein the polyethylene glycol has an average molecular weight of between about 300 g/mol and 1000 g/mol.

7. A method of preparing copolyester fibers according to claim 1, wherein the step of spinning filaments from the copolyester comprises spinning copolyester filaments at a temperature cetween about 260° C. and 300° C.

8. A method of preparing copolyester fibers according to claim 1, further comprising the step of forming the copolyester into chips after the step of copolymerizing polyethylene glycol and a chain branching agent into polyethylene terephthalate in the melt phase and before the step of spinning the copolyester composition into a filament.

9. A method of preparing copolyester fibers according to claim 1, wherein the step of spinning the copolyester composition into a filament comprises spinning filaments having a mean tenacity of less than 3 grams per denier.

10. A method of preparing copolyester fibers according to claim 1, wherein the weight fraction of polyethylene glycol in the copolyester composition and the intrinsic viscosity of the copolyester after melt phase polymerization are defined by the shaded region of FIG. 1.

11. A method of preparing copolyester fibers according to claim 1, wherein:

the weight fraction of polyethylene glycol in the copolyester composition is about 5 percent; and the copolyester composition has an intrinsic viscosity of between about 0.67 and 0.78 dl/g.

12. A method of preparing copolyester fibers according to claim 1, wherein:

the weight fraction of polyethylene glycol in the copolyester composition is between about 10 and 12 percent; and the copolyester composition has an intrinsic viscosity of between about 0.73 and 0.88 dl/g.

13. A method of preparing copolyester fibers according to claim 1, wherein:

the weight fraction of polyethylene glycol in the copolyester composition is about 15 percent; and the copolyester composition has an intrinsic viscosity of between about 0.80 and 0.93 dl/g.

14. A method of preparing copolyester fibers according to claim 1, wherein the chain branching agent is selected from the group consisting of pentaerythritol, dipentaerythritol, trimesic acid, pyromellitic acid, pyromellitic dianhydride, trimellitic acid, trimellitic anhydride, trimethylol propane, and ditrimethylol propane.

15. A method of preparing copolyester fibers according to claim 14, wherein:

the chain branching agent is pentaerythritol; and the pentaerythritol is present in the copolyester composition in an amount between about 110 and 500 ppm.

16. A method for producing copolyester fibers according to claim 1, further comprising dyeing the copolyester filament at a temperature of less than about 2400° F.

17. A method for producing copolyester fibers according to claim 16, wherein the step of dyeing the copolyester filament at a temperature of less than about 240° F. comprises dyeing the copolyester filament at a temperature of less than about 220° F.

18. A method for producing copolyester fibers according to claim 17, wherein the step of dyeing the copolyester filament at a temperature of less than about 220° F. comprises dyeing the copolyester filament at or below a temperature defined by the boiling point of water at atmospheric pressure.

19. A method for producing copolyester fibers according to claim 18, wherein the step of dyeing the copolyester filament at or below a temperature defined by the boiling point of water at atmospheric pressure comprises dyeing the copolyester filament using a high-energy dye between about 200° F. and 212° F.

20. A method for producing copolyester fibers according to claim 18, wherein the step of dyeing the copolyester filaments at or below a temperature defined by the boiling point of water at atmospheric pressure comprises dyeing the copolyester filament using a low-energy dye between about 180° F. and 200° F.

21. A method of preparing polyethylene glycol modified copolyester fibers that can be formed into excepntioinally comfortable fabrics, comprising:

reacting in the melt phase ethylene glycol and a reactant selected from the group consisting of terephthalic acid and dimethyl terephthalate in the presence of polyethylene glycol and a branching agent to form a low molecular weight prepolymer;

polymerizing the prepolymer in the melt phase to form a copolyester composition that has an intrinsic viscosity of at least about 0.73 dl/g and that achieves a zero-shear melt viscosity of at least about 2000 poise when heated to 260° C.;

wherein the polyethylene glycol has an average molecular weight of less than about 5000 g/mol and is present in the resulting copolyester composition between about 10 percent and 12 weight percent;

wherein the chain branching agent is present in the resulting copolyester composition in an amount between about 0.0003 and 0.0014 mole-equivalent branches per mole of standardized polymer, the standardized polymer being unmodified polyethylene terephthalate;

thereafter spinning from the copolyester composition fibers having a mean tenacity of less than 3 grams per denier.

22. A method for producing copolyester fibers according to claim 21, further comprising dyeing the fibers at a temperature of less than about 240° F.

23. A method for producing copolyester fibers according to claim 22, wherein the step of dyeing the copolyester fibers at a temperature of less than about 240° F. comprises dyeing the fibers at or below a temperature defined by the boiling point of water at atmospheric pressure.

24. A method for producing copolyester fibers according to claim 21, further comprising texturing the fibers by a technique selected from the group consisting of air jet method, edge crimping method, false-twist method, gear crimping method, knit-de-knit method, and stuffer box method.

25. A method of preparing polyethylene glycol modified copolyester fibers that can be formed into exceptionally comfortable fabrics, comprising:

copolymerizing polyethylene glycol and a chain branching agent into polyethylene terephthalate in the melt phase to form a copolyester composition that comprises polymer chains formed from structural units consisting essentially of diol monomers. aromatic non-substituted diacid monomers, and branching agent monomers, and that achieves a zero-shear melt viscosity of between about 2000 and 3500 poise when heated to 260° C.;

wherein the polyethylene terephthalate is present in the copolyester composition in an amount sufficient for a fiber made from the copolyester composition to possess dimensional stability properties substantially similar to those of conventional, unmodified polyethylene terephthalate fibers;

wherein the polyethylene glycol has an average molecular weight of less than about 5000 g/mol and is present in an amount sufficient for a fiber made from the copolyester composition to possess wicking, drying, and static-dissipation properties that are superior to those of conventional, unmodified polyethylene terephthalate fibers; and wherein the chain branching agent is present in the copolyester composition in an amount less than about 0.0014 mole-equivalent branches per mole of standardized polymer, the standardized polymer being unmodified polyethylene terephthalate; and thereafter spinning the copolyester composition into a filament.

26. A method of preparing copolyester fibers according to claim 25, wherein the weight fraction of polyethylene glycol in the copolyester composition is between about 4 percent and 20 percent.

27. A method of preparing copolyester fibers according to claim 25, wherein the polyethylene glycol has an average molecular weight of between about 300 g/mol and 1000 g/mol.

28. A method of preparing copolyester fibers according to claim 25, wherein the step of spinning the copolyester composition into a filament comprises spinning filaments having a mean tenacity of less than 3 grams per denier.

29. A method preparing copolyester fibers according to claim 25, further comprising dyeing the filament at a temperature of less than about 240° F.

30. A polyethylene glycol modified copolyester composition that is particularly suitable for fibers, comprising:
  polyethylene terephthalate in an amount sufficient for a fiber made from said composition to possess dimensional stability properties substantially similar to those of conventional, unmodified polyethylene terephthalate fibers;
  polyethylene glycol in an amount sufficient for a fiber made from said composition to possess wicking, drying, and static-dissipation properties that are superior to those of conventional, unmodified polyethylene terephthalate fibers, wherein the polyethylene glycol has an average molecular weight of less than about 5000 g/mol; and
  chain branching agent selected from the group consisting of trifunctional alcohols, trifunctional acids, tetrafunctional alcohols, tetrafunctional acids, pentafunctional alcohols, pentafunctional acids, hexafunctional alcohols, and hexafunctional acids that will copolymerize with polyethylene terephthalate, wherein the chain branching agent is present in said composition in an amount less than about 0.0014 mole-equivalent branches per mole of standardized polymer, the standardized polymer being unmodified polyethylene terephthalate;
  wherein said composition comprises polymer chains formed from structural units consisting essentially of diol monomers, aromatic non-substituted diacid monomers, and branching agent monomers; and
  wherein the weight fraction of polyethylene glycol in said composition and the intrinsic viscosity of said composition are defined by the shaded region of FIG. 1.

31. A copolyester composition according to claim 25, wherein:
  the weight fraction of polyethylene glycol in said composition is between about 10 and 12 percent; and
  said composition has an intrinsic viscosity of between about 0.73 and 0.88 dl/g.

32. A copolyester composition according to claim 30, wherein said composition achieves a zero-shear melt viscosity of between about 2000 and 3500 poise when heated to 260° C.

33. A copolyester composition according to claim 30, wherein the chain branching agent is selected from the group consisting of pentaerythritol, dipentaerythritol, trimesic acid, pyromellitic acid, pyromellitic dianhydride, trimellitic acid, trimellitic anhydride, trimethylol propane, and ditrimethylol propane.

34. A copolyester fiber formed from said composition according to claim 30.

35. A copolyester chip formed from said composition according to claim 30.

36. A polyethylene glycol modified copolyester fiber that can be formed into exceptionally comfortable fabrics, comprising:
  polyethylene terephthalate in an amount sufficient for said copolyester fiber to possess dimensional stability properties substantially similar to those of conventional, unmodified polyethylene terephthalate fibers;
  polyethylene glycol in an amount sufficient for said copolyester fiber to possess wicking, drying, and static-dissipation properties that are superior to those of conventional, unmodified polyethylene terephthalate fibers, wherein the polyethylene glycol has an average molecular weight of less than about 5000 g/mol; and
  chain branching agent in an amount less than about 0.0014 mole-equivalent branches per mole of standardized polymer, the standardized polymer being unmodified polyethylene terephthalate;
  wherein said copolyester fiber comprises polymer chains formed from structural units consisting essentially of diol monomers, aromatic non-substituted diacid monomers, and branching agent monomers; and
  wherein said copolyester fiber has an intrinsic viscosity of at least about 0.67 dl/g.

37. A copolyester fiber according to claim 36, wherein the weight fraction of the polyethylene glycol in said copolyester fiber is between about 4 percent and 20 percent.

38. A copolyester fiber according to claim 36, wherein the weight fraction of the polyethylene glycol in said copolyester fiber is between about 8 percent and 14 percent.

39. A copolyester fiber according to claim 36, wherein the weight fraction of the polyethylene glycol in said copolyester fiber is between about 10 percent and 12 percent.

40. A copolyester fiber according to claim 36, wherein the polyethylene glycol has an average molecular weight of between about 300 g/mol and 1000 g/mol.

41. A copolyester fiber according to claim 36, wherein said copolyester fiber has a mean tenacity of less than 3 grams per denier.

42. A copolyester fiber according to claim 36, wherein the weight fraction of polyethylene glycol in said copolyester fiber and the intrinsic viscosity of said copolyester fiber are defined by the shaded region of FIG. 1.

43. A copolyester fiber according to claim 36, wherein:
  the weight fraction of polyethylene glycol in said copolyester fiber is about 5 percent; and
  said copolyester fiber has an intrinsic viscosity of between about 0.67 and 0.78 dl/g.

44. A copolyester fiber according to claim 36, wherein:
  the weight fraction of polyethylene glycol in said copolyester fiber is between about 10 and 12 percent; and
  said copolyester fiber has an intrinsic viscosity of between about 0.73 and 0.88 dl/g.

45. A copolyester fiber according to claim 36, wherein:
  the weight fraction of polyethylene glycol in said copolyester fiber is about 15 percent; and
  said copolyester fiber has an intrinsic viscosity of between about 0.80 and 0.93 dl/g.

46. A copolyester fiber according to claim 36, wherein the chain branching agent selected from the group consisting of trifunctional alcohols, trifunctional acids, tetrafunctional alcohols, tetrafunctional acids, pentafunctional alcohols, pentafunctional acids, hexafunctional alcohols, and hexafunctional acids that will copolymerize with polyethylene terephthalate.

47. A copolyester fiber according to claim 36, wherein the chain branching agent is selected from the group consisting of pentaerythritol, dipentaerythritol, trimesic acid, pyromellitic acid, pyromellitic dianhydride, trimellitic acid, trimellitic anhydride, trimethylol propane, and ditrimethylol propane.

48. A copolyester fiber according to claim 36, wherein said copolyester fiber is a staple fiber.

49. A yarn formed from copolyester fibers according to claim 36.

50. A yarn according to claim 49, wherein said yarn is a partially oriented yarn.

51. A yarn according to claim 49, wherein said yarn is a drawn yarn.

52. A fabric formed from copolyester fibers according to claim 36.

53. A polyethylene glycol modified copolyester fiber that can be formed into exceptionally comfortable fabrics, comprising:
   polyethylene terephthalate in an amount sufficient for said copolyester fiber to possess dimensional stability properties substantially similar to those of conventional, unmodified polyethylene terephthalate fibers;
   polyethylene glycol in an amount sufficient for said copolyester fiber to possess wicking, drying, and static-dissipation, dyeability, and tactility properties that are superior to those of conventional, unmodified polyethylene terephthalate fibers, wherein the polyethylene glycol has an average molecular weight of less than about 5000 g/mol; and
   chain branching agent in an amount between about 0.0003 and 0.0014 mole-equivalent branches per mole of standardized polymer, the standardized polymer being unmodified polyethylene terephthalate;
   wherein said copolyester fiber is comprised of polymer chains formed from structural units consisting essentially of diol monomers, aromatic non-substituted diacid monomers, and branching agent monomers; and
   wherein said copolyester fiber has an intrinsic viscosity of at least about 0.67 dl/g.

54. A copolyester fiber according to claim 53, wherein the weight fraction of polyethylene glycol in said copolyester fiber and the intrinsic viscosity of said copolyester fiber are defined by the shaded region of FIG. 1.

55. A copolyester fiber according to claim 53, wherein:
   the weight fraction of polyethylene glycol in said copolyester fiber is between about 10 and 12 percent; and
   said copolyester fiber has an intrinsic viscosity of between about 0.73 and 0.88 dl/g.

56. A copolyester fiber according to claim 53, wherein the chain branching agent is selected from the group consisting of pentaerythritol, dipentaerythritol, trimesic acid, pyromellitic acid, pyromellitic dianhydride, trimellitic acid, trimellitic anhydride, trimethylol propane, and ditrimethylol propane.

57. A copolyester fiber according to claim 53, wherein said copolyester fiber has a mean tenacity of less than 3 grams per denier.

58. A yarn formed from copolyester fibers according to claim 53.

59. A fabric formed from copolyester fibers according to claim 53.

60. A polyethylene glycol modified copolyester fiber that can be formed into exceptionally comfortable fabrics, comprising:
   polyethylene terephthalate in an amount sufficient for said copolyester fiber to possess dimensional stability properties substantially similar to those of conventional, unmodified polyethylene terephthalate fibers;
   polyethylene glycol in an amount sufficient for said copolyester fiber to possess wicking, drying, and static-dissipation properties that are superior to those of conventional, unmodified polyethylene terephthalate fibers, wherein the polyethylene glycol has an average molecular weight of less than about 5000 g/mol; and
   chain branching agent in an amount less than about 0.0014 mole-equivalent branches per mole of standardized polymer, the standardized polymer being unmodified polyethylene terephthalate;
   wherein said copolyester fiber comprises polymer chains formed from structural units consisting essentially of diol monomers, aromatic non-substituted diacid monomers, and branching agent monomers; and
   wherein said copolyester fiber achieves a zero-shear melt viscosity of between about 2000 and 3500 poise when heated to 260° C.

61. A copolyester fiber according to claim 60, wherein the weight fraction of the polyethylene glycol in said copolyester fiber is between about 4 percent and 20 percent.

62. A copolyester fiber according to claim 60, wherein the weight fraction of the polyethylene glycol in said copolyester fiber is between about 10 percent and 12 percent.

63. A copolyester fiber according to claim 60, wherein the polyethylene glycol has an average molecular weight of between about 300 g/mol and 1000 g/mol.

64. A copolyester fiber according to claim 60, wherein said copolyester fiber has a mean tenacity of less than 3 grams per denier.

65. A method of preparing copolyester fibers according to claim 1, wherein the weight fraction of polyethylene glycol in the copolyester composition is between 10 percent and 20 percent.

66. A method of preparing copolyester fibers according to claim 1, wherein the weight fraction of polyethylene glycol in the copolyester composition is between 4 percent and 6 percent.

67. A method of preparing copolyester fibers according to claim 1, wherein the polyethylene glycol has an average molecular weight of about 400 g/mol.

68. A method of preparing copolyester fibers according to claim 1, wherein the copolyester composition has an intrinsic viscosity of at least about 0.73 dl/g.

69. A method of preparing copolyester fibers according to claim 1, wherein the copolyester composition has an intrinsic viscosity of at least about 0.80 dl/g.

70. A method of preparing copolyester fibers according to claim 21, wherein the polyethylene glycol has an average molecular weight of between about 300 g/mol and 1000 g/mol.

71. A method of preparing copolyester fibers according to claim 21, wherein the polyethylene glycol has an average molecular weight of about 400 g/mol.

72. A method of preparing copolyester fibers according to claim 21, wherein the copolyester composition has an intrinsic viscosity of at least about 0.80 dl/g.

73. A method of preparing copolyester fibers according to claim 25, wherein the weight fraction of polyethylene glycol in the copolyester composition is between 10 percent and 20 percent.

74. A method of preparing copolyester fibers according to claim 25, wherein the weight fraction of polyethylene glycol in the copolyester composition is between about 10 percent and 12 percent.

75. A method of preparing copolyester fibers according to claim 25, wherein the weight fraction of polyethylene glycol in the copolyester composition is between 4 percent and 6 percent.

76. A method of preparing copolyester fibers according to claim 25, wherein the polyethylene glycol has an average molecular weight of about 400 g/mol.

77. A method of preparing copolyester fibers according to claim 25, wherein the copolyester composition has an intrinsic viscosity of at least about 0.73 dl/g.

78. A method of preparing copolyester fibers according to claim 25, wherein the copolyester composition has an intrinsic viscosity of at least about 0.80 dl/g.

79. A method of preparing copolyester fibers according to claim 25, wherein the chain branching agent is present in the copolyester composition in an amount between about 0.0003 and 0.0014 mole-equivalent branches per mole of standardized polymer.

80. A copolyester composition according to claim 30, wherein:

the weight fraction of polyethylene glycol in said composition is between 10 and 15 percent; and said composition has an intrinsic viscosity of between about 0.73 and 0.93 dl/g.

81. A copolyester composition according to claim 30, wherein:

the weight fraction of polyethylene glycol in said composition is about 5 percent; and said composition has an intrinsic viscosity of at least about 0.67 dl/g.

82. A copolyester composition according to claim 30, wherein the polyethylene glycol has an average molecular weight of between about 300 g/mol and 1000 g/mol.

83. A copolyester composition according to claim 30, wherein the polyethylene glycol has an average molecular weight of about 400 g/mol.

84. A copolyester composition according to claim 30, wherein the chain branching agent is present in the copolyester composition in an amount between about 0.0003 and 0.0014 mole-equivalent branches per mole of standardized polymer.

85. A copolyester fiber according to claim 36, wherein the weight fraction of the polyethylene glycol in said copolyester fiber is between 10 and 20 percent.

86. A copolyester fiber according to claim 36, wherein the weight fraction of the polyethylene glycol in said copolyester fiber is between 4 percent and 6 percent.

87. A copolyester fiber according to claim 36, wherein the polyethylene glycol has an average molecular weight of about 400 g/mol.

88. A copolyester fiber according to claim 36, wherein said copolyester fiber has an intrinsic viscosity of at least about 0.73 dl/g.

89. A copolyester fiber according to claim 36, wherein said copolyester fiber has an intrinsic viscosity of at least about 0.80 dl/g.

90. A copolyester fiber according to claim 36, wherein the chain branching agent is present in said copolyester fiber in an amount between about 0.0003 and 0.0014 mole-equivalent branches per mole of standardized polymer.

91. A copolyester fiber according to claim 53, wherein the weight fraction of the polyethylene glycol in said copolyester fiber is between 10 and 20 percent.

92. A copolyester fiber according to claim 53, wherein the weight fraction of the polyethylene glycol in said copolyester fiber is between 4 percent and 6 percent.

93. A copolyester fiber according to claim 53, wherein the polyethylene glycol has an average molecular weight of between about 300 and 1000 g/mol.

94. A copolyester fiber according to claim 53, wherein the polyethylene glycol has an average molecular weight of about 400 g/mol.

95. A copolyester fiber according to claim 53, wherein said copolyester fiber has an intrinsic viscosity of at least about 0.73 dl/g.

96. A copolyester fiber according to claim 53, wherein said copolyester fiber has an intrinsic viscosity of at least about 0.80 dl/g.

97. A copolyester fiber according to claim 60, wherein the weight fraction of the polyethylene glycol in said copolyester fiber is between 10 and 20 percent.

98. A copolyester fiber according to claim 60, wherein the weight fraction of the polyethylene glycol in said copolyester fiber is between 4 percent and 6 percent.

99. A copolyester fiber according to claim 60, wherein the polyethylene glycol has an average molecular weight of about 400 g/mol.

100. A copolyester fiber according to claim 60, wherein said copolyester fiber has an intrinsic viscosity of at least about 0.73 dl/g.

101. A copolyester fiber according to claim 60, wherein said copolyester fiber has an intrinsic viscosity of at least about 0.80 dl/g.

102. A copolyester fiber according to claim 60, wherein the chain branching agent is present in said copolyester fiber in an amount between about 0.0003 and 0.0014 mole-equivalent branches per mole of standardized polymer.

* * * * *

UNITED STATES PATENT AND TRADEMARK OFFICE
CERTIFICATE OF CORRECTION

PATENT NO. : 6,291,066 B1
DATED : September 18, 2001
INVENTOR(S) : Branum

It is certified that error appears in the above-identified patent and that said Letters Patent is hereby corrected as shown below:

Column 1,
Line 11, "Polvester" should read -- Polyester --.

Column 2,
Line 29, "Polvester" should read -- Polyester --.
Line 52, "Glvcol" should read -- Glycol --.
Line 53, "Polvester" should read -- Polyester --.

Column 7,
Line 48, "ethers" should read -- others --.

Column 8,
Line 46, "icopolyester" should read -- copolyester --.

Column 12,
Line 64, "washfastness" should read -- wash-fastness --.

Column 13,
Line 51, "and" should read -- than --.
Line 54, after "79" insert a -- . --.

Column 15,
Line 20, "1" x7"" should read -- 1" x 7" --.

Column 18,
Lines 10-11, "ie." should read -- *i.e.* --.

Column 19,
Line 47, delete "is".

Column 20,
Line 15, "falsetwist" should read -- false-twist --

Column 21,
Lines 15 and 16, both occurrences, "dinier" should read -- denier --.
Line 18, after "speed" insert -- is --.

UNITED STATES PATENT AND TRADEMARK OFFICE
CERTIFICATE OF CORRECTION

PATENT NO. : 6,291,066 B1
DATED : September 18, 2001
INVENTOR(S) : Branum

It is certified that error appears in the above-identified patent and that said Letters Patent is hereby corrected as shown below:

Column 24,
Line 67, "pentaerthyritol" should read -- pentaerythritol --.

Column 25,
Line 12, "Texturin" should read -- Texturing --.
Line 37, "TexturinG" should read -- Texturing --.

Column 26,
Line 48, "cetween" should read -- between --.

Column 27,
Line 61, "excepntioinally" should read -- exceptionally --.
Line 31, "2400°F" should read -- 240°F --.

Column 28,
Line 42, delete the "." and insert a -- , --.

Column 29,
Line 31, "triflinctional" should read -- trifunctional --;
Line 32, "tetraflnctional" should read -- tetrafunctional --;
Line 34, "hexafimctional" should read -- hexafunctional --.
Line 48, "claim 25" should read -- claim 30 --.

Signed and Sealed this

Twelfth Day of November, 2002

*Attest:*

JAMES E. ROGAN
*Attesting Officer*   *Director of the United States Patent and Trademark Office*